United States Patent
Young

(10) Patent No.: US 8,937,103 B2
(45) Date of Patent: Jan. 20, 2015

(54) METHOD FOR REDUCING $CO_2$ IN A GASEOUS STREAM BY CONVERSION TO A SYNGAS FOR PRODUCTION OF ENERGY

(75) Inventor: Gary C. Young, Cedar Rapids, IA (US)

(73) Assignee: Gyco, Inc., Cedar Rapids, IA (US)

( * ) Notice: Subject to any disclaimer, the term of this patent is extended or adjusted under 35 U.S.C. 154(b) by 254 days.

(21) Appl. No.: 13/367,147

(22) Filed: Feb. 6, 2012

(65) Prior Publication Data

US 2013/0203142 A1    Aug. 8, 2013

Related U.S. Application Data

(63) Continuation-in-part of application No. 13/085,175, filed on Apr. 12, 2011, now Pat. No. 8,507,567, which is a continuation of application No. 12/271,227, filed on Nov. 14, 2008, now Pat. No. 7,932,298, which is a continuation-in-part of application No. 11/956,107, filed on Dec. 13, 2007, now Pat. No. 7,923,476.

(51) Int. Cl.
  *C07C 27/00* (2006.01)
  *C12P 7/06* (2006.01)
  *C01B 3/38* (2006.01)

(52) U.S. Cl.
  USPC .................... 518/704; 435/161; 252/373

(58) Field of Classification Search
  CPC ............. C10J 3/00; C10J 3/721; C10J 3/84; C07C 29/1518; C12P 7/06; B01J 19/24
  See application file for complete search history.

(56) References Cited

U.S. PATENT DOCUMENTS

| | | | |
|---|---|---|---|
| 4,166,786 A * | 9/1979 | Duraiswamy et al. | 208/410 |
| 2004/0018144 A1 | 1/2004 | Briscoe | |
| 2006/0143980 A1 | 7/2006 | Rapier et al. | |
| 2007/0004809 A1 | 1/2007 | Lattner et al. | |
| 2007/0282021 A1 * | 12/2007 | Campbell | 518/726 |
| 2008/0169449 A1 | 7/2008 | Mundschau | |
| 2008/0307703 A1 | 12/2008 | Dietenberger et al. | |
| 2009/0018222 A1 * | 1/2009 | Klepper et al. | 518/704 |
| 2009/0170968 A1 | 7/2009 | Nahas et al. | |
| 2009/0221720 A1 | 9/2009 | Belt et al. | |

(Continued)

OTHER PUBLICATIONS

Kalinenko, Plasma Chemistry and Plasma Processing, 13(1), 1993, p. 141-167.*

*Primary Examiner* — Jafar Parsa
*Assistant Examiner* — Amy C Bonaparte
(74) *Attorney, Agent, or Firm* — Slater & Matsil, L.L.P.

(57) ABSTRACT

A system and method for reducing the $CO_2$ in a gaseous stream between 33% up to and even in excess of 90%, by reducing $CO_2$. A gaseous stream that includes substantial amounts of $CO_2$ is provided to a reaction chamber along with $H_2O$ (steam) and a carbon source such as charcoal, coke or other carbonaceous material. Carbon is provided to the chamber at a ratio ($C/CO_2$) of between about 0.100 to 0.850, and between about 0.200 to 0.900 of $H_2O$ to the provided $CO_2$. The $CO_2$, $H_2O$ and carbon are heated to between about 1500° F. and about 3000° F. at about one atmosphere to produce syngas (i.e. carbon monoxide (CO) and hydrogen ($H_2$)) and reduces the amount of $CO_2$. The Syngas may then be cleaned and provided to a Fischer-Tropsch synthesis reactor or a Bio-catalytic synthesis reactor to produce a fuel, such as Methanol, Ethanol, Diesel and Jet Fuel.

51 Claims, 10 Drawing Sheets

(56) References Cited

U.S. PATENT DOCUMENTS

| | | |
|---|---|---|
| 2009/0221721 A1 | 9/2009 | Norbeck et al. |
| 2010/0129691 A1* | 5/2010 | Dooher et al. .................. 429/17 |
| 2010/0137459 A1 | 6/2010 | Stites et al. |
| 2010/0200810 A1 | 8/2010 | Schmidt et al. |
| 2011/0067306 A1 | 3/2011 | Balmas et al. |
| 2011/0186783 A1 | 8/2011 | Young |

* cited by examiner

METHOD FOR REDUCING CO₂ IN A GASEOUS STREAM BY CONVERSION TO A SYNGAS FOR PRODUCTION OF ENERGY

This application is a continuation-in-part of application Ser. No. 13/085,175 (now U.S. Pat. No. 8,507,567) filed on Apr. 12, 2011 entitled "Method and Apparatus for Reducing $CO_2$ in a Stream by Conversion to a Syngas for Production of Energy," which is a continuation of application Ser. No. 12/271,227 (now U.S. Pat. No. 7,932,298) filed on Nov. 14, 2008, which is a continuation-in-part of application Ser. No. 11/956,107 (now U.S. Pat. No. 7,923,476) filed on Dec. 13, 2007, entitled "Method and Apparatus for Reducing $CO_2$ in a Stream by Conversion to a Syngas for Production of Energy," which respectively are incorporated herein by reference.

TECHNICAL FIELD

The present invention relates generally to the field of reducing the carbon dioxide in a gaseous stream, such as the exhaust stream from cement plants, power plants and other types of industrial plants, and more specifically to the use of a unique process of reducing the carbon dioxide to concurrently form Syngas (primarily $CO_2+H_2$). The syngas can, in turn, be used in the production of energy in the form of various fuel sources, such as for example only, Ethanol, Methanol, Diesel and jet Fuel.

BACKGROUND

Concern about global warming eventually leads to discussions about the need to reduce the amount of carbon dioxide that pours into the earth's atmosphere on a daily basis from power plants and other industrial factories. At the same time, concerns about dwindling supplies of fossil fuels have encouraged the development of other types of liquid fuels, such as Ethanol, as replacement fuels. Unfortunately, many of the present methods of producing a liquid fuel such as Ethanol require expensive farm produce such as, for example, corn and almost all of these alternate methods result in about as much or more carbon dioxide being introduced into the atmosphere as does burning fossil fuels.

Therefore, a method for producing syngas, (easily convertible to Ethanol and other fuels) from the $CO_2$ in gaseous streams that are exhausted by industrial plants would offer many advantages in cost, as well as, a significant overall reduction in the carbon dioxide dumped into the atmosphere.

SUMMARY OF THE INVENTION

The present invention discloses methods and apparatus for reducing and forming syngas from the significant quantities of carbon dioxide that is often present in gaseous streams exhausted or emitted from power plants and various types of industrial plants that use fossil fuels, such as, for example, a cement plant. As an example only, the typical cement production plant will have a total gaseous exhaust stream of about 400,000 lbs/hr. The exhaust stream will typically contain about 30%-40% (about 160,000 lbs/hr) of carbon dioxide ($CO_2$), 55%-60% (231,000 lbs/hr) of nitrogen ($N_2$); around 2% (7,800 lbs/hr) of oxygen ($O_2$) and small amounts of other constituents. However, according to this invention, instead of the $CO_2$ contained in such a gaseous stream being exhausted to the atmosphere or collected and disposed of by methods such as sequestration, the gaseous stream is provided to a reaction chamber, such as, for example, a Plasma Arc Gasification Chamber or a Pyrolysis Chamber along with the additional reactants, carbon and $H_2O$. Reactions are then initiated in the reaction chamber, typically without the assistance of a catalyst, and significant amounts of the $CO_2$ in the gaseous stream are converted to commercially usable syngas (carbon monoxide and hydrogen ($CO+H_2$)).

In a computer simulated test run of the invention using the above example as the gaseous stream, the amount of carbon dioxide in the gaseous stream is reduced from 160,000 lbs/hr to about 75,195 lbs/hr plus a significant amount of syngas. This is a reduction in carbon dioxide of about 53% and depending on the content or make up of the gaseous stream, some form of vitrified slag or ash will also usually be present. Actual test runs, which were severely limited by the capabilities of the reaction chamber and other equipment, have still resulted in reductions of carbon dioxide of 67% and predictive calculations indicate reductions the process of this invention can achieve a reduction of the carbon dioxide above 90%.

Therefore, it is clear that the process of the present invention significantly reduces the amount of $CO_2$ (carbon dioxide) in a reaction chamber. Further, as mentioned above, the process also generates substantial amounts of syngas from the reduction or conversion of the $CO_2$. The syngas can then be converted to various types of fuels such as ethanol. Briefly, the process comprises maintaining the reaction chamber at a pressure of about one bar or greater and at a temperature of between about 1500° F. (815.6° C.) to about 3000° F. (1649° C.), and preferably at about 2426° F. (1330° C.). A gaseous stream containing the carbon dioxide ($CO_2$) is provided to the reactor at a first selected rate along with carbon (C) that is provided at a second selected rate. The mass ratio of the rate of providing carbon with respect to the rate of providing $CO_2$ being between about 0.100 and 0.850, and preferably between about 0.200 and about 0.700. $H_2O$ (steam) is also provided to the reaction chamber at a third selected rate, wherein the mass ratio of the provided $H_2O$/steam with respect to the provided $CO_2$ rate is between about 0.200 and 0.500, and preferably between about 0.250 and 0.450. The carbon is then reacted with the $H_2O$/steam and the carbon dioxide ($CO_2$) in the gaseous stream and results in a reduction of the $CO_2$ by at least 30% to concurrently form syngas comprising carbon monoxide (CO) and hydrogen ($H_2$). The selected rate at which the carbon, the $CO_2$ and the $H_2O$/steam is provided is controlled such that substantially all of the carbon exiting the reaction chamber in said syngas is combined with $O_2$, $H_2O$, and $CO_2$ to primarily produce CO and $H_2$. That is, substantially no carbon (C) exits the chamber in the syngas that is not combined.

The syngas can then be cleaned, if necessary, and used as a feedstock for the production of ethanol and/or other fuels. For example, a bio-chemical process or a Fischer-Tropsch (F-T) process could be used to produce the ethanol.

As mentioned above, the process for reducing the carbon dioxide and forming the syngas according to this invention consists essentially of maintaining a reaction chamber, such as a pyrolysis chamber or a plasma arc chamber, at a temperature of between about 1500° F. (815.6° C.) and 3000° F. (1649° C.) and preferably at about 2426° F. (1330° C.) with a pressure of about one atmosphere or greater. It will be appreciated that some of the reactions in the chamber are endothermic and therefore, regardless of the type of reaction chamber used, additional heat may be required. Therefore, Plasma Arc or Pyrolysis chambers are at present the preferred choices for use as the reaction chamber. However, a conventional gasifier reactor, or a gasification reactor are also believed to be suitable.

According to the invention, in addition to the $CO_2$ (carbon dioxide) a source of carbon (C) including carbonaceous materials such as charcoal, coal, coke, or solid or bio waste, etc., is present in a reactor that is operating at sufficient temperatures such that a Boudouard reaction (i.e., $C+CO_2 \rightleftharpoons 2CO$) takes place. Further, as will be discussed later, it should also be understood and appreciated that the use of higher temperatures in the reaction chamber avoids the serious problem of carbon formation and deposition of the formed carbon on chamber walls and in and on items in the chamber. In addition, an although a catalyst is not required according to the present invention, if it is determined that the presence of a catalyst in the chamber can improve the effectiveness of the process, it will be appreciated that since there is substantially no elemental carbon formation in the reaction chamber with the process of this invention, there can be no carbon formed that will be deposited on the chamber walls or that could form on and deactivate the catalyst. As is well known to those skilled in the art catalyst deactivation due to carbon deposits is a common problem with reaction chambers.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The presently preferred embodiments are discussed in detail below. It should be appreciated, however, the present invention provides many applicable inventive concepts that can be embodied in a wide variety of specific contexts. The specific embodiments discussed are merely illustrative of specific ways to make and use the invention, and are not intended to limit the scope of the invention.

Figure 1:
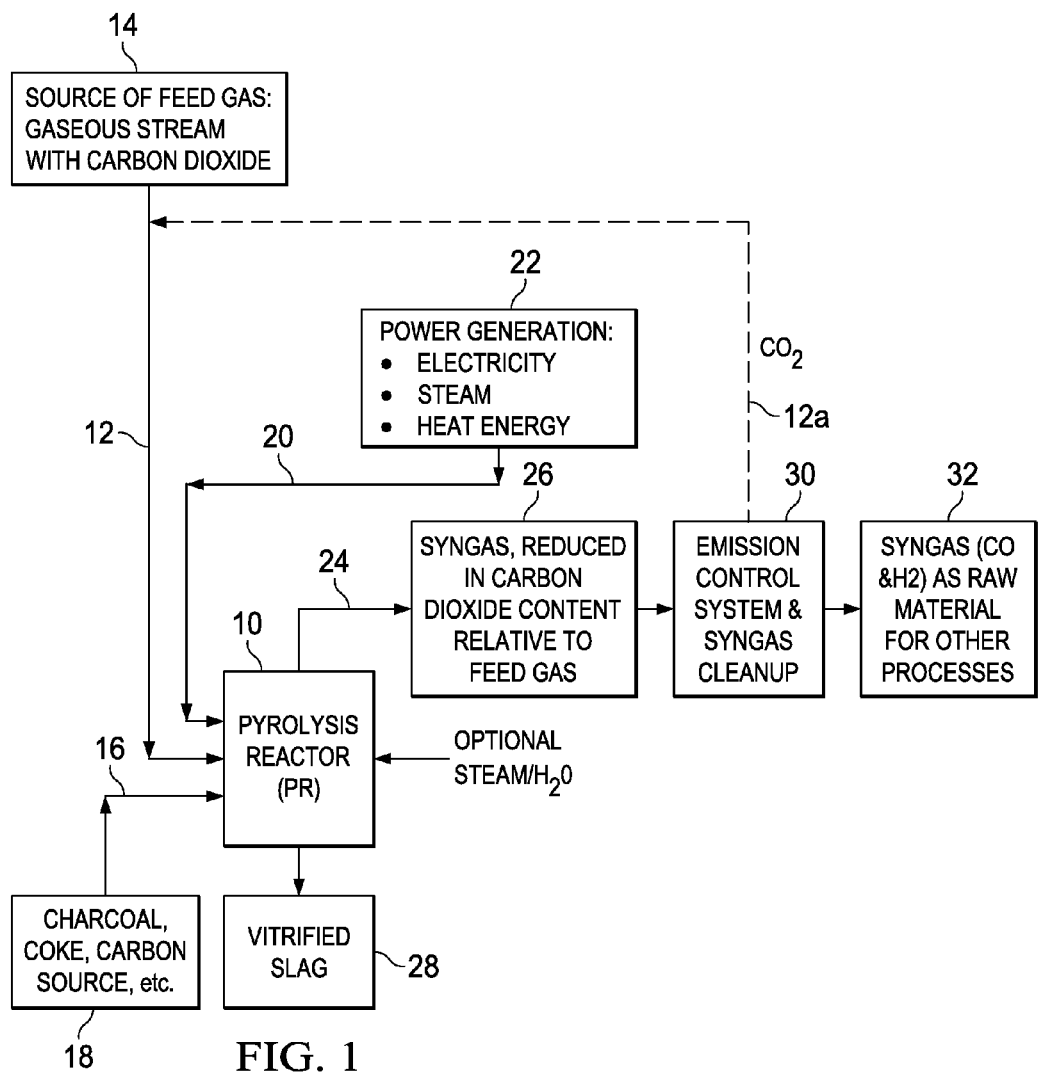
FIG. 1 is a block diagram illustrating the processes of the present invention.

Referring now to FIG. 1, there is illustrated a simplified block diagram of the present inventive process. As shown, a reaction chamber 10 receives a source of carbon (C), $H_2O$ (steam), and a source of carbon dioxide ($CO_2$). The source of $CO_2$ may typically be provided by a gaseous stream, such as exhaust gases from an industrial plant or facility that contain a significant amount of carbon dioxide ($CO_2$), as indicated by line 12. As examples only, the source 14 of the carbon dioxide or $CO_2$ could be from a fossil fuel power plant or from substantially any industrial gaseous exhaust stream, such as, a rotary kiln type cement plant, a refinery, an ethanol plant, a utility power plant, etc. As a more specific example, the gaseous stream from a rotary kiln will typically comprise between about 55% to about 70% nitrogen ($N_2$) and about 45% to about 30% carbon dioxide ($CO_2$) and possibly minute amounts of oxygen ($O_2$) and other impurities. It will also be appreciated, of course, that although exhaust gases from an industrial plant is considered an excellent source of carbon dioxide, a source of pure carbon dioxide would also be suitable and would simplify the process. In the embodiment of FIG. 1, the reaction chamber 10 is illustrated as a pyrolysis reactor, but a conventional gasifier may also be suitable, and alternately, to avoid the introduction of excessive $O_2$, a plasma arc chamber that uses an ionized gas with minimal or no oxygen may be preferable.

In prior art processes that use a pyrolysis reaction or process for the gasification of coal, or the reforming of methane, the formation of carbon deposits in the reaction chamber must be carefully avoided so that such deposits will not form on the catalyst to maintain the catalyst at its maximum effectiveness. Such carbon formation and deposits are typically avoided in these prior art processes by maintaining the reaction chamber at a low temperature such as between 600° C. (1112° F.) and 850° C. (1562° F.), although there have been some reports of using a temperature of 982° C. (1800 F) in a reaction chamber for coal gasification. It should be understood, however, there is no known reports of using such a high temperature for the purpose of converting carbon dioxide to syngas. (See Choudhary, et. al., "Simultaneous steam and $CO_2$ reforming of methane to syngas over NiO/MgO/SA-5205 in the presence and absence of oxygen", 1998, Applied Catalyst A: General, no 168, pp 33-46; Lemonidou et. al., "Carbon dioxide reforming of methane over 5 wt. % Ni/CaO-A12-03 catalyst", 2002, Applied Catalyst A: General, no 228, pp. 227-235; and U.S. Pat. No. 5,937,652 issued to Fawzy T. Abdelmalek, August, 1999). As will be appreciated by those skilled in the art, the conditions in a reaction chamber are typically at about one atmosphere or one bar, but can be higher. Further, in the prior art and as mentioned above, reaction chamber temperatures of between about 600° C. and 850° C. are typical for coal gasification, but not for the purpose of converting carbon dioxide to syngas.

A primary chemical reaction that will take place in a reaction chamber containing carbon dioxide ($CO_2$) and a source of carbon (C) in the absence of free oxygen is believed to be the reaction of carbon (C) in the carbonaceous material with the carbon dioxide ($CO_2$) according to:

$$C + CO_2 \leftrightarrow 2CO, \quad \text{Equation (1)}$$

that is often referred to as a Boudouard reaction.

If $H_2O$ (typically in the form of steam) is also available in the reaction chamber 10, other reactions that can occur in the reaction chamber may include:

$$C + H_2O \leftrightarrow CO + H_2, \quad \text{Equation (2)}$$

often referred to as gasification with steam;

$$CO + H_2O \leftrightarrow H_2 + CO_2, \quad \text{Equation (3)}$$

referred to as a water-gas shift reaction; and $$C_nH_m + nH_2O \leftrightarrow nCO + (n + \tfrac{1}{2}m)H_2, \quad \text{Equation (4)}$$

representing steam reforming. In addition, if free Oxygen ($O_2$) is present from any source, including the Plasma Torch gas or in the carbon source, $CO_2$ may be reformed such that the total reduction of $CO_2$ will be decreased;

$$C + O_2 \leftrightarrow CO_2 \quad \text{Equation (5)}$$

Importantly, in the present invention and as seen from the Boudouard reaction of Equation (1), the carbon (C) provided by the source 18 combines with one of the two oxygen (O) atoms in the carbon dioxide ($CO_2$) molecules to form two molecules of carbon monoxide (2CO). As will be appreciated by those skilled in the art, as indicated by Equation (2), if water (e.g. steam) is also present in the reaction chamber, the carbon (C) may also react with the water ($H_2O$) to produce carbon monoxide and free hydrogen ($H_2$). The mixture of CO and $H_2$ is commonly referred to as syngas. It should also be appreciated, that all of the carbon dioxide ($CO_2$) in the gaseous stream may not be converted to carbon monoxide (i.e., CO). Further, as was discussed above and as will be discussed in more detail later, excess $H_2O$ (steam) may also react with some of the carbon monoxide (CO) to reform some carbon dioxide ($CO_2$) and some hydrogen ($H_2$) as indicated by Equation (3). Also, some of the carbon (C) may react with free oxygen $O_2$ to reform small amounts of $CO_2$, and consequently, the exhaust from the reaction chamber will often contain and therefore discharge a reduced amount of carbon dioxide ($CO_2$) (indicated by block 26) along with the syngas as indicated on line 24. Also, as shown, there will typically be a vitrified slag or ash product 28 produced by the process. The chemical content of the vitrified slag or ash will, of course, vary according to the elements in the carbonaceous source and the temperature of the reaction chamber.

However, unlike most prior art pyrolysis processes (a pyrolysis process is the thermal decomposition of organic material by heating in the absence of oxygen and other reagents or material: (except possibly steam) that will reduce the amount of carbon dioxide and form syngas), and until the applicants prior invention (See U.S. Pat. Nos. 7,923,476 and 7,932,298 incorporated herein by reference), the inter-reaction of these various reactions were not sufficiently understood, and therefore could not be controlled such that a significant amount of the $CO_2$ could be reduced and converted to syngas. The unique process of the present improvement invention defines unexpected effective ratios of carbon (C), carbon dioxide ($CO_2$) and $H_2O$/steam for the reduction of the carbon dioxide $CO_2$ and uses reaction temperatures typically no lower than about 815° C. (1499° F.) and preferably about 1330° C. (2426° F.) up to 3000° C. (5432° F.) or even higher. Thus, by maintaining a temperature range in the reaction chamber 10 that is significantly higher than that typically used in prior art processes, along with the unique and proper ratios of C, $CO_2$, and $H_2O$, carbon deposits, which are a major problem with many pyrolysis reactions, are not formed in the chamber of the present invention even though, as indicated by line 16, large quantities of carbon are required to be present in the reactor 10 to achieve the desired carbon dioxide reduction and the conversion to syngas by the pyrolysis reaction of this invention.

As discussed above, the source 18 of the carbon in the chamber may be various suitable carbonaceous materials such as charcoal, coke, coal, or even other hydrocarbon sources, such as biomass materials or municipal waste solids. In addition, as will be appreciated by those skilled in the art and as discussed above, since the pyrolysis reaction takes place at elevated temperatures, heat is provided as indicated at line 20 from an energy source 22. The energy source may originate as electricity, steam or any other source that can generate heat energy. However, it is noted, that as suggested above and as will be discussed in more detail later, many energy sources for providing additional heat, may undesirably introduce additional oxygen into the chamber that will affect the efficiency of the process such that the ratio of the $CO_2$, C, and $H_2O$ may need to be adjusted.

More specifically four different embodiments of computer simulation tests of the invention and shown as Table 1-Table 4 follow. The results according to a first computer simulation test of the invention are illustrated in Table 1 below as a first embodiment. This computer simulation test illustrates an embodiment wherein a reaction chamber 10 is maintained at a temperature of 1,330° C. (2,426° F.) and a pressure of 1.00 bars. The gaseous stream containing carbon dioxide, and other input materials of the simulation process are as shown below. Also shown is the expected syngas output according to the computer simulation model.

TABLE 1

| | \multicolumn{6}{c|}{CHAMBER CONDITIONS 1330° C. AND 1.00 BAR} |
|---|---|---|---|---|---|---|
| | (Mole %) | (Weight %) | (K Mole/hr) | (Mole %) | (Weight %) | (K Mole/hr) |
| | \multicolumn{3}{c|}{INPUT TO CHAMBER} | \multicolumn{3}{c|}{SYNGAS FROM CHAMBER} |
| FEED GAS | | | | | | |
| Nitrogen ($N_2$) | 56.52 | 52.13 | 0.680 | 45.79 | 47.44 | 0.680 |
| Methane ($CH_4$) | 0.08 | 0.04 | 0.001 | 0.00 | 0.00 | 0.00 |
| Carbon Monoxide (CO) | 0.08 | 0.08 | 0.001 | 31.04 | 32.16 | 0.461 |
| Carbon Dioxide ($CO_2$) | 24.94 | 36.13 | 0.300 | 9.49 | 15.46 | 0.141 |
| Hydrogen ($H_2$) | 0.08 | 0.01 | 0.001 | 7.07 | 0.53 | 0.105 |
| Oxygen ($O_2$) | 1.67 | 1.75 | 0.02 | 0.00 | 0.00 | 0.000 |
| OTHER INPUTS | | | | | | |
| Water ($H_2O$) | 16.63[1] | 9.86[1] | 0.200[1] | 6.61 | 4.41 | 0.098 |
| Carbon (C) | | | 0.300 | | | 0.000 |
| TOTAL | 100.00 | 100.00 | 1.503 | 100.00 | 100.00 | 1.485 |

[1]Includes moisture in original Gas stream plus any $H_2O$ to facilitate gasification.

The above embodiment illustrates that the feed gas provided to the chamber could be comprised of nitrogen, methane, carbon dioxide, hydrogen, water moisture in the gas and oxygen wherein the carbon dioxide in this feed gas is then converted to syngas by adding carbon and $H_2O$ (steam) to the chamber. The chamber should be maintained at a temperature of about 1,330° C. and 1.0 bar pressure. As shown, by this computer simulation, a substantial amount of the carbon dioxide (53%) will be converted to syngas under these chamber conditions. It should also be noted that the amount of carbon (C) introduced into the reaction chamber is controlled such that it is substantially fully reacted or combined as CO or $CO_2$ such that only minute amounts, if any, unreacted carbon (C) will be contained in the resulting generated syngas.

A second computer simulation test shows how an input of insufficient $H_2O$ and insufficient carbon results in a negative effect on the reduction of $CO_2$ and the amount of formed Syngas in the chamber. The second simulation test yielded the results shown in Table 2 below.

TABLE 2

CHAMBER CONDITIONS 1330° C. AND 1.00 BAR

| | (Mole %) | (Weight %) | (K mole/hr) | (Mole %) | (Weight %) | (K Mole/hr) |
|---|---|---|---|---|---|---|
| | INPUT TO CHAMBER | | | SYNGAS FROM CHAMBER | | |
| FEED GAS | | | | | | |
| Nitrogen | 61.65 | 54.83 | 0.680 | 61.70 | 54.82 | 0.680 |
| Methane | 0.09 | 0.05 | 0.001 | 0.00 | 0.00 | 0.000 |
| Carbon Monoxide | 0.09 | 0.08 | 0.001 | 0.00 | 0.00 | 0.000 |
| Carbon Dioxide | 27.20 | 38.01 | 0.300 | 27.50 | 38.37 | 0.303 |
| Hydrogen | 0.09 | 0.01 | 0.001 | 0.00 | 0.00 | 0.000 |
| Oxygen | 1.81 | 1.84 | 0.020 | 1.45 | 1.47 | 0.016 |
| OTHER INPUTS | | | | | | |
| Water ($H_2O$) | 9.07[1] | 5.18[1] | 0.100[1] | 9.35 | 5.34 | 0.103 |
| Carbon (C) | | | 0.001 | | | 0.000 |
| | 100.00 | 100.00 | 1.103 | 100.00 | 100.00 | 1.102 |

[1]Includes moisture in the original gaseous stream plus water added to facilitate gasification.

Note:
The amount of carbon dioxide ($CO_2$) in the Syngas or exhaust output actually increased above the amount of ($CO_2$) originally in the Feed gas due to insufficient amounts of water and carbon in the feed to the chamber.

It is again noted that as in the above example, the carbon (C) provided to the chamber was controlled so that no unreacted carbon was in the generated syngas leaving the chamber. A third test shown in Table 3 also further illustrates the effect of insufficient $H_2O$ and insufficient carbon.

TABLE 3

CHAMBER CONDITIONS 1330° C. AND 1.00 BAR

| | (Mole %) | (Weight %) | (K mole/hr) | (Mole %) | (Weight %) | (K Mole/hr) |
|---|---|---|---|---|---|---|
| | INPUT TO CHAMBER | | | OUTPUT FROM CHAMBER | | |
| COMPONENT | | | | | | |
| Nitrogen | 61.65 | 54.82 | 0.680 | 57.38 | 52.98 | 0.680 |
| Methane | 0.09 | 0.05 | 0.001 | 0.00 | 0.00 | 0.000 |
| Carbon Monoxide | 0.09 | 0.08 | 0.001 | 12.57 | 11.61 | 0.149 |
| Carbon Dioxide | 27.20 | 38.01 | 0.300 | 21.35 | 30.98 | 0.253 |
| Hydrogen | 0.09 | 0.01 | 0.001 | 10.41 | 0.10 | 0.0167 |
| Oxygen | 1.81 | 1.84 | 0.020 | 0.00 | 0.00 | 0.000 |
| OTHER INPUTS | | | | | | |
| Water ($H_2O$) | 9.07[1] | 5.19[1] | 0.100[1] | 7.29 | 4.33 | 0.0864 |
| Carbon (C) | | | 0.100 | | | |
| TOTAL | | 100 | 1.203 | 100.00 | 100.00 | 1.1851 |

[1]Includes moisture in original gas steam plus water to facilitate gasification.

Note:
In the Syngas from the chamber, the Oxygen ($O_2$) content went to zero but the Carbon dioxide ($CO_2$) reduction was only 15.7%. Insufficient water and insufficient Carbon in the feed to the chamber resulted in the poor reduction of Carbon dioxide in the feed gas. Of course, since the amount of carbon (C) provided to the reaction chamber was not even sufficient to convert the $CO_2$, there was no unreacted carbon in the resulting syngas.

Still another example of a simulated process of reducing the carbon dioxide in a gain a gaseous stream from a Corn-to-Ethanol production plant is as follows:

TABLE 4

CHAMBER CONDITIONS 1330° C. and 3.08 bar

| | INPUTS TO GASIFIER | | SYNGAS FROM GASIFIER | |
|---|---|---|---|---|
| COMPONENT | Kmole/hr) | (Mole %) | (Kmole/hr) | (Kgram/hr) |
| FEED GAS | | | | |
| Nitrogen ($N_2$) | 0.0001 | 0.00 | 0.00 | 0.00 |
| Methane ($CH_4$) | 0.0001 | 0.00 | 0.00 | 0.00 |
| Carbon monoxide (CO) | 0.0001 | 0.00 | 968.0 | 27,113.68 |
| Carbon dioxide ($CO_2$) | 388.2 | 95.48 | 2.89 | 127.19 |
| Hydrogen ($H_2$) | | | | |

TABLE 4-continued

CHAMBER CONDITIONS 1330° C. and 3.08 bar

| COMPONENT | INPUTS TO GASIFIER | | SYNGAS FROM GASIFIER | |
|---|---|---|---|---|
| | Kmole/hr | (Mole %) | (Kmole/hr) | (Kgram/hr) |
| Oxygen ($O_2$) | 0.0001 | 0.00 | 0.00 | 0.00 |
| Water ($H_2O$, moisture) | 18.38 | 4.52 | 1.81 | 32.61 |
| SUBTOTAL OTHER INPUTS | 406.5805 | | | 100.00 |
| Added $H_2O$ | 180.38 | | | |
| Carbon | 582.3 | | | |

The above embodiment illustrates another embodiment, wherein the feed gas provided to the chamber is comprised of carbon dioxide, hydrogen, water (moisture), oxygen and minute amounts of methane and nitrogen. Similar to the previous embodiment shown in Tables 1-3, the carbon dioxide in the feed gas is converted to syngas by adding carbon and $H_2O$ (steam) to the chamber, except in this embodiment, the chamber operates at a 3.08 bars of pressure. It is also important to note that the target temperature of 1330° C. (2426° F.) was used in this simulation test. However, during the simulation test it was noted that, all of the carbon (C) is essentially depleted or used up in the conversion process to syngas. Therefore, a temperature of about 1330° C. may be a significant temperature. As shown, since almost all of the carbon dioxide (99.3%) will be converted, i.e., a reduction of Carbon Dioxide ($CO_2$) in the feed gas of 99.3%, and, of course essentially no carbon will be present in the exhaust or syngas.

Figure 2:
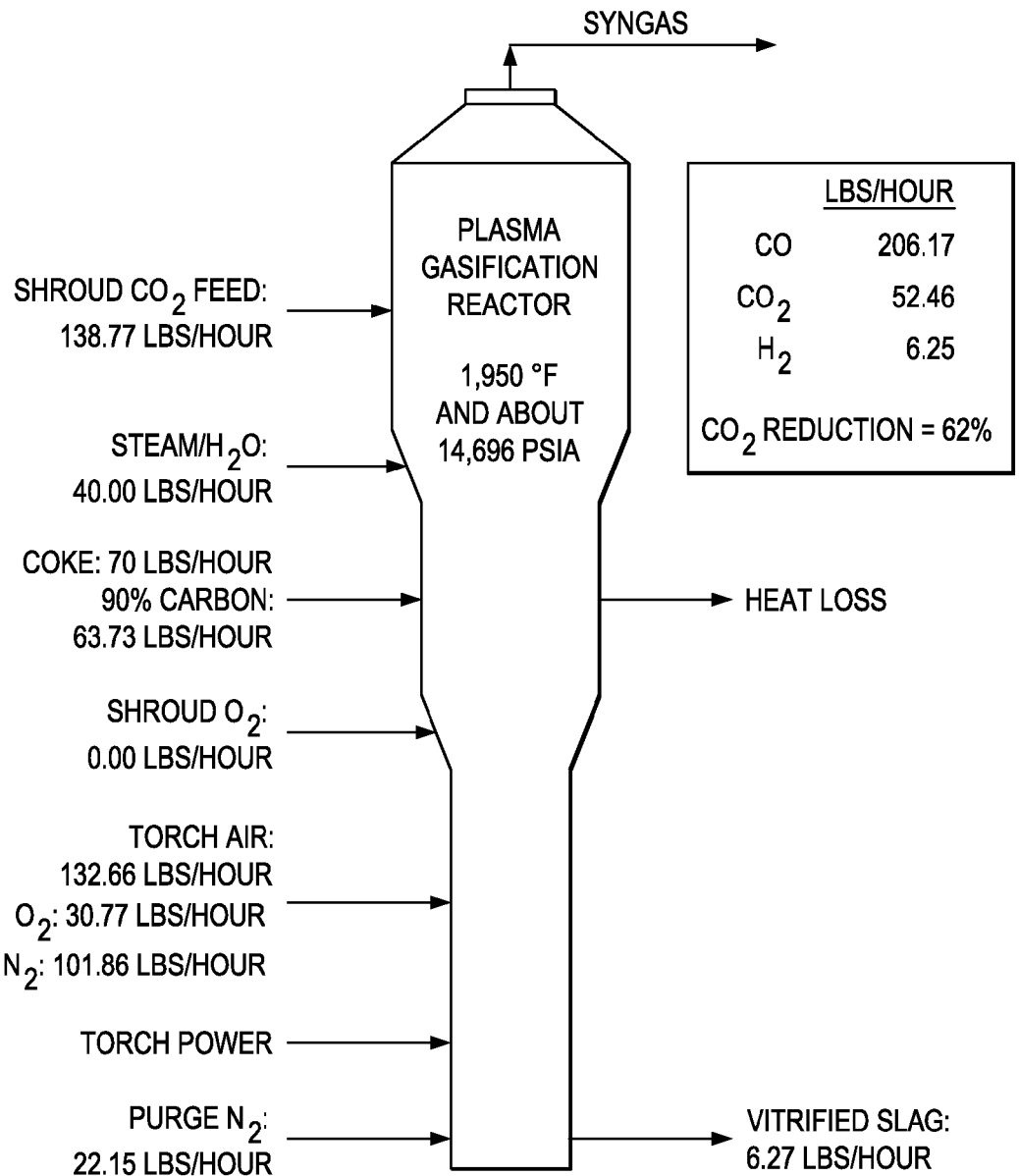
FIG. 2 illustrates the inputs and outputs of the reactor of the invention.

The inventive concept illustrated by the computer simulated test runs discussed above for the conversion of carbon dioxide ($CO_2$) to syngas (CO and $H_2$) have been verified by actual tests carried out at a first Pilot Plant Plasma Gasification Reactor (PGR). The test parameters and results of these actual tests are set out in Tables 5-8 below. The weight amounts of the input and output parameters in Tables 5-8, are in different units of (lbs/hr), and represent the parameter units recorded at the pilot plant. FIG. 2 illustrates the equipment used for the first actual test run with inputs and outputs similar to the embodiment of Table 5. FIG. 2 is also appropriate for test runs represented by Tables 5-8 discussed later, except various ones of the inputs and consequently the outputs have changed. It should also be noted, that there was no measurable unreacted carbon (C) in the exhaust or syngas produced by the reaction in any of the test runs illustrated in Tables 5-8.

TABLE 5

(Case 1)

| COMPONENT | INPUTS TO GASIFIER | | OUTPUT FROM GASIFIER 1950° F. (1066° C.) and 14.696 psia | |
|---|---|---|---|---|
| | (SCFM) | (lb/hr) | (Vol %) | (lbs/hr) |
| Shroud $CO_2$ | 19.94 | 138.42 | | |
| Torch Air (Approximately 30.51 lbs/hr $O_2$ & 99.73 lbs/hr $N_2$ & Ar) | 28.96 | 132.06 | | |
| Nitrogen purge | 5.0 | 21.95 | | |
| Coke, 70 lb/hr total at 91.0% Carbon | | 63.70 | | |
| $H_2O$ (steam) | | 40.00 | | |

TABLE 5-continued (Case 1)

| SYNGAS OUTPUT | | |
|---|---|---|
| Carbon monoxide (CO) | 44.95 | 207.56 |
| Carbon dioxide ($CO_2$) | 7.210 | 52.32 |
| Hydrogen ($H_2$) | 18.76 | 6.19 |
| Ar | 0.10 | 0.66 |
| Nitrogen ($N_2$) | 27.03 | 124.81 |
| Oxygen ($O_2$) | 0.02 | 0.10 |
| $H_2O$ | 1.50 | 4.45 |
| TOTAL (approximately) | 396 (402 including other output) | 396 (402 including other output) |

OTHER OUTPUTS:

Approximate output from bottom of Gasifier: 6.27 lbs/hr Slag/Vitrified slag

Note:
213.75 lbs/hr of usable syngas (CO and $H_2$) and about 6.27 lbs/hr Slag/Vitrified slag was produced Note:
The feed ratio of carbon (C) to $CO_2$ is 0.460 lbs/.lbs, and the feed ratio of Steam ($H_2O$) to $CO_2$ is 0.289 lbs/lb. The feed ratio of total oxygen $O_2$ to $CO_2$ is 0.220 lbs/lb.

Note:
Water in = 40.00 lbs/hr or 2.22035 lbs-mole/hr; Carbon in = 63.70 lbs/hr or 5.30580 lbs-mole/hr; and Water out = 4.45 lbs/hr or 0.24701 lbs-mole/hr Such that % Water consumed/carbon in × 100 = [(2.22035 − 0.24701)/5.30580] × 100 = 37.2%

In this test, the $CO_2$ conversion rate was 64.0% (includes $CO_2$ generated in-situ of 7.0 lb/hr). However, the gasification temperature of 1950° F. was below the target temperature of 2426° F. because the plasma heat torch did not have the power to supply the desired energy to bring the chamber to the target temperature of 2426° F. It should also be noted that the reaction chamber incorporated a coke bed to supply the carbon that was depleted at a rate of six inches per hour, which translates to 70 lbs/hr.

Thus, as set out above, it is seen that at the completion of the process the carbon dioxide ($CO_2$) has been reduced by about 64.0%. As is well known, the input mass to the reactor must, of course, equal the mass output from the reactor. The inputs and outputs of the reaction chamber shown in Table 5 are clearly equal. Specifically, the total lbs/hr input equals approximately 396 lbs/hr and comprises 132.06 lbs/hr from torch air and 21.95 from purge $N_2$; 138.42 lbs/hr of $CO_2$; plus 63.70 lbs/hr of Carbon/Coke plus 40 lbs/hr of Water/Steam. Likewise, the mass output also equals approximately 396 lbs/hr and comprises 124.81 lbs/hr of $N_2$ (from torch air and purge) plus 207.56 lbs/hr of CO plus 6.19 lbs/hr of $H_2$ plus 52.32 lbs/hr of $CO_2$ and plus 4.45 lbs/hr of $H_2O$ and 0.10 lb/hr $O_2$. No measurable uncombined carbon (C) was in the mass output. In addition, to the reduction of the $CO_2$, the process resulted in 213.75 lbs/hr of CO plus $H_2$, i.e., basic components of Syngas. Total Syngas production is 396 lbs/hr (105 SCFM). Even after clean up, the syngas provides a significant economic advantage, since as will be appreciated various bio-catalytic processes effectively use syngas and/or carbon monoxide (CO) as feed stock for organisms in bioreactors that produce Ethanol or may use a Fisher-Tropsch (F-T) synthesis process that converts syngas to Ethanol.

Three additional test runs according to the embodiment of FIG. 2 are shown in Tables 6-8, except the inputs and the resulting outputs have changed.

TABLE 6

(Case 2)

| COMPONENT | INPUTS TO GASIFIER | | OUTPUT FROM GASIFIER 1900° F. (1038° C.) and 14.696 psia | |
|---|---|---|---|---|
| | (SCFM) | (lb/hr) | (Vol %) | (lbs/hr) |
| Shroud $CO_2$ | 15.05 | 104.48 | | |
| Torch Air (Approximately 30.55 lbs/hr $O_2$ & 99.87 lbs/hr $N_2$ & Ar) | 29.0 | 132.24 | | |
| Nitrogen purge | 5.0 | 21.95 | | |
| Coke, 70 lb/hr total at 91.0% Carbon | | 63.70 | | |
| $H_2O$ (steam) | | 40.00 | | |
| SYNGAS OUTPUT | | | | |
| Carbon monoxide (CO) | | | 42.29 | 181.5 |
| Carbon dioxide ($CO_2$) | | | 7.44 | 50.18 |
| Hydrogen ($H_2$) | | | 20.33 | 6.23 |
| Ar | | | 0.10 | 0.61 |
| Nitrogen ($N_2$) | | | 27.86 | 119.57 |
| Oxygen ($O_2$) | | | 0.02 | 0.09 |
| $H_2O$ | | | 1.50 | 4.14 |
| TOTAL (approximately) | | 362 (368 including other output) | | 362 (368 including other output) |

OTHER OUTPUTS:

Approximate output from bottom of Gasifier: 6.27 lbs/hr Slag/Vitrified slag

Note:
187.73 lbs/hr of usable syngas (CO and $H_2$) and about 6.27 lbs/hr Slag/Vitrified slag was produced.
Note:
The feed ratio of carbon to $CO_2$ is 0.610 lbs/lbs, and the feed ratio of Steam ($H_2O$) to $CO_2$ is 0.383 lbs/lbs The feed ratio of total oxygen $O_2$ to $CO_2$ is 0.292 lbs/lbs
Note:
Water in = 40.00 lbs/hr or 2.22035 lbs-mole/hr; Carbon in = 63.7 lbs/hr or 5.3058 lbs-mole/hr; and Water out = 4.14 lbs/hr or 0.2298 lbs-mole/hr. Such that % Water consumed/carbon in × 100 = [(2.22035 − 0.2298)/5.30580] × 100 = 37.5%

In this test, the $CO_2$ conversion rate was 55.0% (includes $CO_2$ generated in-situ of 7.0 lb/hr). However, the gasification temperature of 1900° F. was again below the target temperature of 2426° F. because the plasma heat torch did not have the power to supply the desired energy to bring the chamber to the target temperature of 2426° F. This gasification temperature was 50° F. less than the temperature of Case 1 shown in Table 5. Also, as in Case 1, the reaction chamber used a coke bed to provide the carbon that was depleted at a rate of six inches per hour, which translates to a 70 lbs/hr flow rate.

Thus, as set out above, it is seen that at the completion of the process the carbon dioxide ($CO_2$) has been reduced by about 55.0%. As discussed above, the input mass to the reactor must, of course, equal the mass output from the reactor. The inputs outputs of the reaction chamber shown in Table 6 are clearly equal. Specifically, the total lbs/hr input equals approximately 362 lbs/hr and the total mass output also equals approximately 362 lbs/hr. It is again noted, there was no measurable uncombined carbon (C) in the output. In addition to the reduction of $CO_2$, the process produces 187.73 lbs/hr of CO and $H_2$, i.e., basic components of Syngas. The total Syngas production is 362 lbs/hr (97 SCFM).

Although the reduction of the $CO_2$ was less than in Case 1, the amount of Syngas produced still provides a significant economic advantage. The reason that Case 1 had a greater reduction of $CO_2$ than Case 2 may be because the higher C/$CO_2$ ratio and $O_2$/$CO_2$ ratio of Case 2, produces proportionately more in-situ $CO_2$ that likely ends up in the syngas and consequently lowers the overall $CO_2$ conversion rate combined with the higher $H_2O$/$CO_2$ more $CO_2$ may have been created in the syngas due to a water-gas shift reaction: $CO+H_2O \leftrightharpoons CO_2+H_2$ as is indicated by less $H_2O$, less CO and more $H_2$ in the syngas.

TABLE 7

(Case 3)

| COMPONENT | INPUTS TO GASIFIER | | OUTPUT FROM GASIFIER 1900° F. (1038° C.) and 14.696 psia | |
|---|---|---|---|---|
| | (SCFM) | (lb/hr) | (Vol %) | (lbs/hr) |
| Shroud $CO_2$ | 15.09 | 104.75 | | |
| Torch Air (Approximately 30.55 lbs/hr $O_2$ & 99.87 lbs/hr $N_2$ & Ar) | 29.0 | 132.24 | | |
| Nitrogen purge | 5.0 | 21.95 | | |
| Coke, 70 lb/hr total at 91.0% Carbon | | 63.70 | | |
| $H_2O$ (steam) | | 23.00 | | |
| SYNGAS OUTPUT | | | | |
| Carbon monoxide (CO) | | | 39.28 | 160.9 |
| Carbon dioxide ($CO_2$) | | | 7.54 | 48.53 |
| Hydrogen ($H_2$) | | | 20.49 | 5.99 |
| Ar | | | 0.10 | 0.58 |
| Nitrogen ($N_2$) | | | 30.65 | 125.55 |
| Oxygen ($O_2$) | | | 0.02 | 0.09 |
| $H_2O$ | | | 1.50 | 3.95 |
| TOTAL (approximately) | | 346 (352 including other output) | | 346 (352 including other output) |

OTHER OUTPUTS:

Approximate output from bottom of Gasifier: 6.27 lbs/hr Slag/Vitrified slag

Note:
166.89 lbs/hr of usable syngas (CO and $H_2$) and about 6.27 lbs/hr Slag/Vitrified slag was produced.
Note:
The feed ratio of carbon to $CO_2$ is 0.608 lbs/lb, and the feed ratio of Steam ($H_2O$) to $CO_2$ is 0.220 lbs/lb. The feed ratio of total oxygen $O_2$ to $CO_2$ is 0.292 lbs/lb.
Note:
Water in = 23.00 lbs/hr or 1.27670 lbs-mole/hr; Carbon in = 63.70 lbs/hr or 5.3035 lbs-mole/hr; and Water out = 3.95 lbs/hr or 0.2188 lbs-mole/hr. Such that % Water consumed/carbon in × 100 = [(1.27670 − 0.2188)/5.3035] × 100 = 19.9%

In this test, the $CO_2$ conversion rate was 56.6% (includes $CO_2$ generated in-situ of 7.0 lbs/hr). However, the gasification temperature of 1900° F. was below the target temperature of 2426° F. because the plasma heat torch did not have the power to supply the desired energy to bring the chamber to the target temperature of 2426° F. This gasification temperature was 50° F. less than the temperature of Case 1 shown in Table 5. Also, as in Case 1 and 2, this test run used a coke bed in the reactor that was depleted at a rate of six inches per hour, which translates to 70 lbs/hr.

Thus, as set out above, it is seen that at the completion of the process the carbon dioxide ($CO_2$) has been reduced by about 56.6%. Also as was true in the previous two cases, the input mass to the reactor must, of course, equal the mass output from the reactor. The mass inputs and outputs of the reaction chamber shown in Table 7 are equal. Specifically, the total lbs/hr input equals approximately 346 lbs/hr and the total mass output also equals approximately 346 lbs/hr.

Although the reduction of the $CO_2$ for this Case 3 was less than in Case 1, but better than Case 2, the amount of Syngas produced (166.89 lbs/hr) was still less than Case 2. However, the amount of syngas produced in Case 3 still provides a significant economic advantage. In addition to the reduction of $CO_2$, the process produces 166.89 lbs/hr of CO and $H_2$, i.e., basic components of Syngas. The total Syngas production is 346 lbs/hr (93 SCFM).

The reason that this Case 3 had a greater reduction of $CO_2$ than Case 2 even though the amount of $CO_2$ lbs/hr is about the same in both Cases, may be because a lower $H_2O$ (Steam)/$CO_2$ created less CO in the syngas as is indicated by the less CO and $H_2$ in the syngas as a result of the lower water feed in Case 3. Also, since the rate of water consumed with respect to the carbon consumed (i.e., 19.9%), the shortage of water results in less CO and $H_2$ being created via the reaction $C+H_2O \leftrightarrow CO+H_2$ because whatever water is available preferentially converts available CO to $CO_2$ via the water-gas shift reaction, i.e., $CO+H_2O \leftrightarrow CO_2+H_2$.

TABLE 8

(Case 0)

| COMPONENT | INPUTS TO GASIFIER | | OUTPUT FROM GASIFIER 2150° F. (1177° C.) and 14.696 psia | |
|---|---|---|---|---|
| | (SCFM) | (lb/hr) | (Vol %) | (lbs/hr) |
| Shroud $CO_2$ | 19.95 | 138.49 | | |
| Torch Air (Approximately 30.52 lbs/hr $O_2$ & 99.76 lbs/hr $N_2$ & Ar) | 28.97 | 132.1 | | |
| Nitrogen purge | 5.0 | 21.95 | | |
| Coke, 70 lb/hr total at 91.0% Carbon | | 63.70 | | |
| $H_2O$ (steam) | | 0.00 | | |
| SYNGAS OUTPUT | | | | |
| Carbon monoxide (CO) | | | 40.53 | 154.1 |
| Carbon dioxide ($CO_2$) | | | 8.64 | 51.63 |
| Hydrogen ($H_2$) | | | 11.34 | 3.08 |
| Ar | | | 0.10 | 0.54 |
| Nitrogen ($N_2$) | | | 37.63 | 143.1 |
| Oxygen ($O_2$) | | | 0.02 | 0.08 |
| $H_2O$ | | | 1.50 | 3.67 |
| TOTAL (approximately) | 356 (362 including other output) | | 356 (362 including other output) | |

TABLE 8-continued (Case 0)

OTHER OUTPUTS:

Approximate output from bottom of Gasifier: 6.27 lbs/hr Slag/Vitrified slag

Note:
157.18 lbs/hr of usable syngas (CO and $H_2$) and about 6.27 lbs/hr Slag/Vitrified slag was produced Note:
The feed ratio of carbon to $CO_2$ is 0.460 lbs/lbs, and the feed ratio of Steam ($H_2O$) to $CO_2$ is 0.000 lbs/lbs The feed ratio of total oxygen $O_2$ to $CO_2$ is 0.220 lbs/lbs Note:
Water in = 0.00 lbs/hr or 0.00 lbs-mole/hr; Carbon in = 63.7 lbs/hr or 5.3035 lbs-mole/hr; and Water out = 3.67 lbs/hr or 0.2037 lbs-mole/hr Such that % Water consumed/carbon in × 100 = [(0.00 − 0.2037)/5.3035] × 100 = −3.84%. That means that water is being produced.

In this Case 0, the $CO_2$ conversion rate was 64.5% (includes $CO_2$ generated in-situ of 7.0 lbs/hr) which is almost the same as in Case 1 (64.0%). However, since the feed ratios of Case 1 and Case 0 are almost the same, with the exception of the $H_2O$(steam)/$CO_2$ ratio, it is likely that a similar amount of in-situ $CO_2$ is created in the syngas of each. However, with no steam feed in Case 0, the energy supply from heat by the Plasma torch allows the temperature to reach 2,150° F. compared to only 1,950° F. for Case 1. Even so, the lower water feed to the Chamber in this Case 0 results in both lower CO and $H_2$ in the syngas. Consequently, it is seen that water/steam in the feed promotes a syngas of higher quality (i.e. more CO and $H_2$). This higher quality is believed to be a result of the reaction $CO+H_2O \rightarrow CO_2$ and $H_2$; and the reaction $C+H_2O \rightarrow CO+H_2$. The decrease in the quantity of syngas produced as well as the lower quality of syngas (i.e. less CO and $H_2$) in Case 0 is believed to be because less water ($H_2O$) is formed by the reaction $H_2+\frac{1}{2}O_2$ and consequently less CO and $H_2$ formed via the $C+H_2O \rightarrow CO+H_2$ reaction. In addition, the water gas-shift reaction may affect $H_2$ production via $CO+H_2O \rightarrow CO_2+H_2$. It should also be noted that coke contains Hydrogen that may potentially form water. The lower production of $H_2$ and CO in Case 0 is likely due to insufficient amounts of water in the feed material. Also, as in cases 1-3, to provide the carbon, a coke bed in the reactor was depleted at a rate of six inches per hour, which translates to 70 lbs/hr.

Data from additional experimental test runs that took place at a later date and that also used equipment substantially as shown in FIG. 2 is set out in Tables 9-1 and 9-2 below. The equipment used in these test runs was similar to the test runs of Tables 5-8, but used a higher powered torch, i.e., a Marc 11 L torch.

TABLE 9-1

| DESCRIPTION | INPUT | | | | | | | | |
|---|---|---|---|---|---|---|---|---|---|
| | RUN 1 | RUN 2 | RUN 3 | RUN 4 | RUN 5 | RUN 6 | RUN 7 | RUN 8 | RUN 9 |
| Mass Ratios | | | | | | | | | |
| $O_2/CO_2$ (*) | 0.459 | 0.392 | 0.346 | 0.281 | 0.292 | 0.418 | 0.255 | 0.279 | 0.455 |
| $C/CO_2$ | 0.672 | 0.586 | 0.432 | 0.475 | 0.420 | 0.592 | 0.441 | 0.549 | 0.493 |
| Steam/$CO_2$ | 0.307 | 0.396 | 0.393 | 0.393 | 0.223 | 0.224 | 0.261 | 0.260 | 0.392 |
| Steam/C | 0.457 | 0.677 | 0.910 | 0.827 | 0.529 | 0.378 | 0.591 | 0.473 | 0.795 |
| Temp. ° F. | 1,953 | 1,835 | 1,886 | 1,631 | 1,632 | 1,719 | 1,553 | 1,733 | 2,018 |
| Torch Power in kWe to reach Temp. | 554 | 546 | 484 | 404 | 411 | 468 | 424 | 470 | 460 |
| INPUTS | | | | | | | | | |
| Torch Air (lbs/hr) | 329 | 329 | 292 | 238 | 238 | 338 | 338 | 370 | 370 |
| Torch Air Composition | | | | | | | | | |
| Torch $N_2$ (lbs/hr) | 248.5 | 248.5 | 220.5 | 179.7 | 179.7 | 255.26 | 255.26 | 279.42 | 279.42 |
| Torch $O_2$ (lbs/hr) | 76.0 | 76.0 | 67.5 | 54.97 | 54.97 | 78.08 | 78.08 | 85.47 | 85.47 |
| Torch Ar (lbs/hr) | 4.24 | 4.24 | 3.77 | 3.08 | 3.08 | 4.36 | 4.36 | 4.77 | 4.77 |
| % Torch $N_2$ wt. %) | 75.52% | 75.52% | 75.52% | 75.52% | 75.52% | 75.52% | 75.52% | 75.52% | 75.52% |
| % Torch $O_2$ wt. %) | 23.10% | 23.10% | 23.10% | 23.10% | 23.10% | 23.10% | 23.10% | 23.10% | 23.10% |
| % Torch Ar wt. %) | 1.29% | 1.29% | 1.29% | 1.29% | 1.29% | 1.29% | 1.29% | 1.29% | 1.29% |
| Coke (lbs/hr) | 135 | 137 | 102 | 112 | 96 | 134 | 163 | 204 | 112 |

TABLE 9-1-continued

| | INPUT | | | | | | | | |
|---|---|---|---|---|---|---|---|---|---|
| DESCRIPTION | RUN 1 | RUN 2 | RUN 3 | RUN 4 | RUN 5 | RUN 6 | RUN 7 | RUN 8 | RUN 9 |
| Carbon (83% Wt. %) | 112.1 | 113.7 | 84.66 | 92.96 | 79.68 | 111.2 | 135.3 | 169.3 | 92.96 |
| Shroud $CO_2$ (lbs/hr) | 154.44 | 182.52 | 182.52 | 182.52 | 175.5 | 175.5 | 294.84 | 294.84 | 175.5 |
| Generated $CO_2$ (lbs/hr) | 11.63 | 11.63 | 13.30 | 13.15 | 13.15 | 11.96 | 11.96 | 13.09 | 13.09 |
| Shroud $N_2$ (lbs/hr) | 368 | 368 | 368 | 302 | 302 | 302 | 302 | 302 | 0 |
| Steam (lbs/hr) | 51 | 77 | 77 | 77 | 42 | 42 | 80 | 80 | 74 |

(*) Free Oxygen was introduced into the chamber via the plasma torch air.

TABLE 9-2

| | OUTPUT | | | | | | | | |
|---|---|---|---|---|---|---|---|---|---|
| | RUN 1 | RUN 2 | RUN 3 | RUN 4 | RUN 5 | RUN 6 | RUN 7 | RUN 8 | RUN 9 |
| Gas Composition | | | | | | | | | |
| CO (Vol. %) | 30.30% | 29.92% | 24.23% | 28.75% | 25.74% | 28.44% | 34.88% | 38.62% | 35.40% |
| $CO_2$ (Vol. %) | 3.68% | 3.50% | 4.65% | 5.98% | 8.61% | 7.99% | 6.70% | 6.05% | 7.05% |
| $H_2$ (Vol. %) | 5.81% | 7.97% | 6.66% | 7.98% | 4.80% | 4.85% | 7.07% | 6.63% | 6.57% |
| $N_2$ (Vol. %) | 56.48% | 53.38% | 55.16% | 52.15% | 57.06% | 56.22% | 47.15% | 44.98% | 40.44% |
| $H_2O$ (Vol. %) | 1.70% | 2.50% | 4.70% | 4.60% | 3.00% | 2.00% | 3.30% | 3.20% | 8.60% |
| $O_2$ (Vol. %) | 2.03% | 2.74% | 4.61% | 0.53% | 0.78% | 0.50% | 0.90% | 0.51% | 1.94% |
| TOTAL (Vol. %) | 100% | 100% | 100% | 100% | 100% | 100% | 100% | 100% | 100% |
| CO (Wt. %) | 31.43% | 31.80% | 25.38% | 30.44% | 25.87% | 28.60% | 36.25% | 40.14% | 37.21% |
| $CO_2$ (Wt. %) | 5.99% | 5.84% | 7.66% | 9.95% | 13.60% | 12.63% | 10.95% | 9.88% | 11.65% |
| $H_2$ (Wt. %) | 0.43% | 0.60% | 0.50% | 0.60% | 0.34% | 0.35% | 0.52% | 0.49% | 0.49% |
| $N_2$ (Wt. %) | 58.60% | 56.72% | 57.78% | 55.22% | 57.35% | 56.55% | 49.00% | 46.74% | 42.51% |
| $H_2O$ (Wt. %) | 1.13% | 1.71% | 3.17% | 3.13% | 1.94% | 1.29% | 2.21% | 2.14% | 5.81% |
| $O_2$ (Wt. %) | 2.41% | 3.33% | 5.52% | 0.65% | 0.90% | 0.57% | 1.07% | 0.61% | 2.33% |
| TOTAL (Wt. %) | 100% | 100% | 100% | 100% | 100% | 100% | 100% | 100% | 100% |
| CO (lbs/hr) | 325.94 | 347.74 | 259.36 | 277.51 | 220.69 | 283.67 | 427.20 | 502.21 | 272.31 |
| $CO_2$ (lbs/hr) | 62.16 | 63.87 | 78.26 | 90.72 | 115.98 | 125.30 | 128.99 | 123.60 | 85.26 |
| $H_2$ (lbs/hr) | 4.46 | 6.61 | 5.09 | 5.50 | 2.94 | 3.46 | 6.18 | 6.16 | 3.61 |
| $N_2$ (lbs/hr) | 607.68 | 620.36 | 590.44 | 503.40 | 489.14 | 560.79 | 577.48 | 584.88 | 311.08 |
| $H_2O$ (lbs/hr) | 11.76 | 18.68 | 32.34 | 28.54 | 16.53 | 12.83 | 25.99 | 26.75 | 42.53 |
| $O_2$ (lbs/hr) | 25.01 | 36.36 | 56.38 | 5.90 | 7.68 | 5.70 | 12.59 | 7.65 | 17.02 |
| TOTAL (lbs/hr) | 1,037.01 | 1,093.63 | 1,021.88 | 911.57 | 852.96 | 991.74 | 1,178.43 | 1,251.24 | 731.81 |
| Total $CO_2$ In (lbs/hr) | 166.07 | 194.31 | 195.95 | 195.78 | 188.76 | 187.61 | 306.95 | 308.10 | 188.76 |
| $CO_2$ Out (lbs/hr) | 62.16 | 63.87 | 78.26 | 90.72 | 115.98 | 125.30 | 128.99 | 123.60 | 85.26 |
| % $CO_2$ Reduction | 62.60% | 67.13% | 60.06% | 53.66% | 38.56% | 33.21% | 57.98% | 59.88% | 54.83% |

Note:
No slag was recovered from these tests. The only potential for slag would be ash from the coke, in which case there was very little.

The effect on $CO_2$ reduction by four (4) input variables determined from the data in Tables 9-1 and 9-2, is discussed in more detail and illustrated in Tables 10-13. The four input variables were the $C/CO_2$ ratio, the $H_2O$ (Steam)/$CO_2$ ratio, the $O_2/CO_2$ ratio and the chamber exit temperature were analyzed, and a predictive equation (Equation (6) shown below) illustrating the effect of the four input variables on the $CO_2$ reduction was developed by statistical analysis from data in Tables 9-1 and 9-2 above.

$CO_2$ Reduction=0.19145−0.07949×C/$CO_2$+0.04844× $H_2O$/$CO_2$−0.34342×O2/CO2+0.00115×Torch-Power     Equation (6)

where, CO/CO2, H2O/CO2 and O2/CO2 are mass ratios, Torch Power is input (KW), and % $CO_2$ Reduction =$CO_2$ Reduction×100

Figure 3:
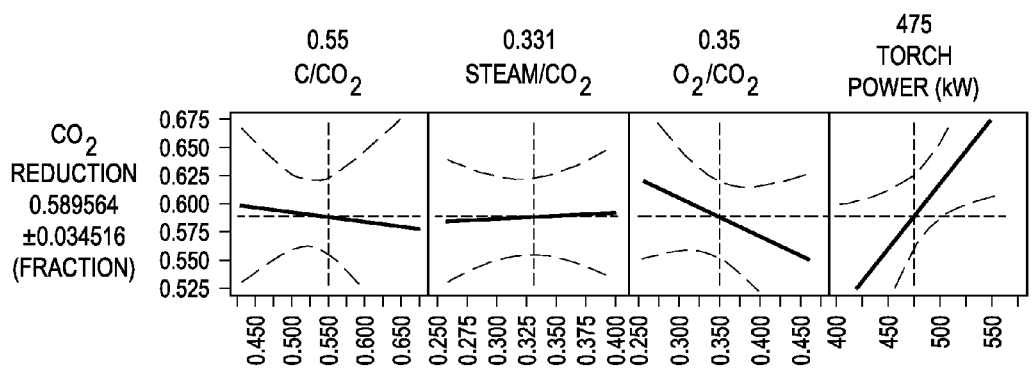
FIG. 3 illustrates predictive curves that compare the $CO_2$ reduction to input ratios $C/CO_2$, $H_2O/CO_2$ and $O_2/CO_2$.

Based on the Predictive Equation (6), the curves of FIG. 3 compare the effect of the four input variables on the amount of $CO_2$ reduction. As shown, the greater the slope of the curve, the greater a change in the variable will have on the amount of $CO_2$ reduction. As shown, the curve with the greater change shows the $CO_2$ reduction as a function of Temperature. However, the Predictive Equation (6) was developed with respect to Torch Power. Although, there is not a strict linear relationship between torch power and the chamber or exhaust temperature, it will be appreciated by those skilled in the art, that the torch power is directly related to the temperature. It is also noted that the negative effect of the presence of free $O_2$ in the chamber, as was discussed above, is clearly illustrated.

In addition, second order curves shown in FIGS. 4-7 were prepared with the data from Tables 9-1 and 9-2, and represent the reduction of $CO_2$ as a function of the four variables (i.e., the $C/CO_2$ ratio, the $H_2O/CO_2$ ratio, the $O_2/CO_2$ ratio, and the temperature, respectively. The shaded areas of each curve reflect the range of data actually measured during the tests, and the portions of the curves outside the shaded areas represent an estimated extension of each of the second order curves.

As mentioned above, FIG. 2 is representative of the equipment used in the test runs that resulted in Tables 9-1 and 9-2 which show the different inputs for each test run. A Carbon source was provided during the tests to maintain the carbon bed or layer in the reactor at a constant level. To accomplish this, the carbon source provided carbon to the reactor at the same rate it was used or consumed during the reaction. Thus, the carbon feed rate also represents the carbon consumption rate. Also, of course, the different inputs for each test results in different outputs. Four of the more significant test runs are identified as Tables 10-13 below and represent Runs 1, 2, 7 and 8. The inputs and the resulting outputs from these test runs (Tables 9-1 and 9-2) are isolated and set out below in Tables 10-13. As was true with the earlier actual test run Cases 1-4/(0), although there is a bed of carbon that remains in the reaction chamber, there was no measurable amount of unreacted carbon (C) discharged in the exhaust or syngas.

Figure 8:
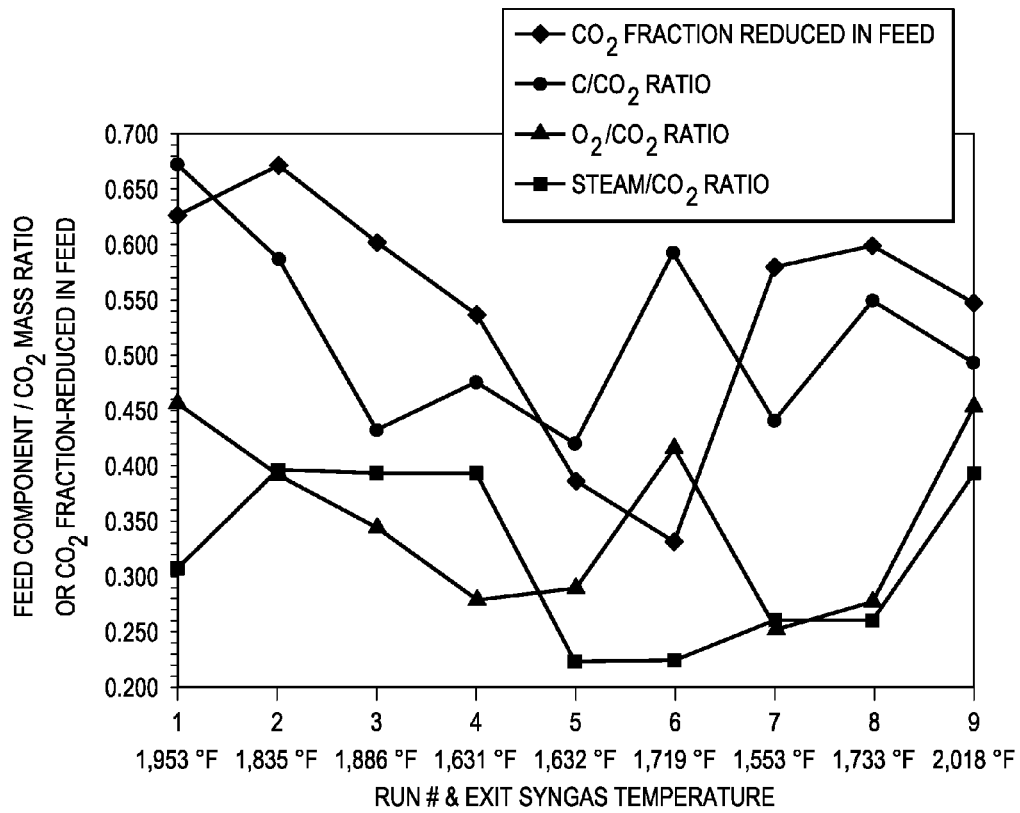
FIG. 8 is a graph of nine test results of the present invention showing ratios of various input materials with respect to the carbon dioxide ($CO_2$) input gaseous stream and resultant $CO_2$ fraction-reduced in feed.
Figure 4:
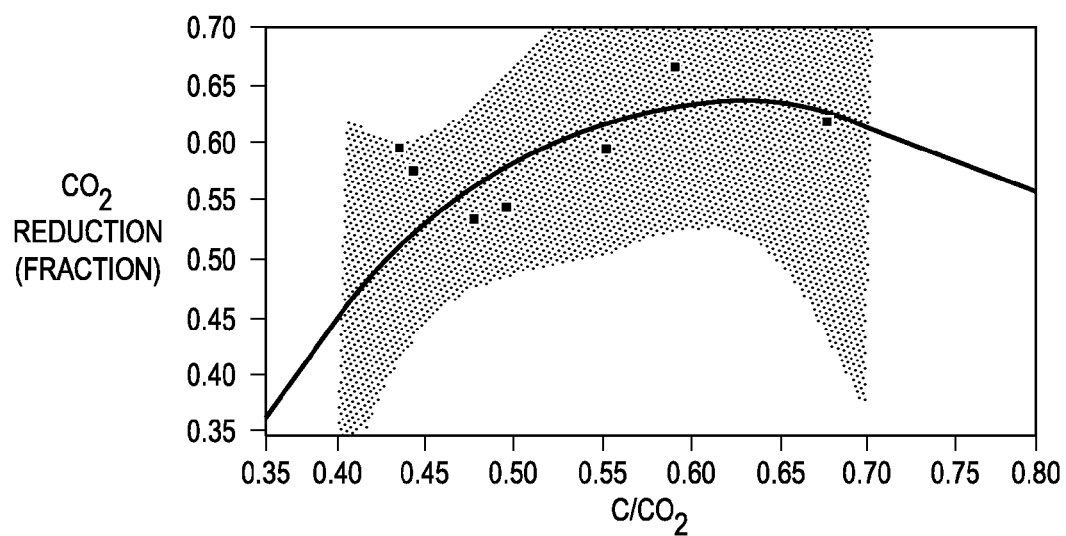
FIGS. 4-7 represent second order curves prepared from the data of Tables 9-1 and 9-2.
Figure 5:
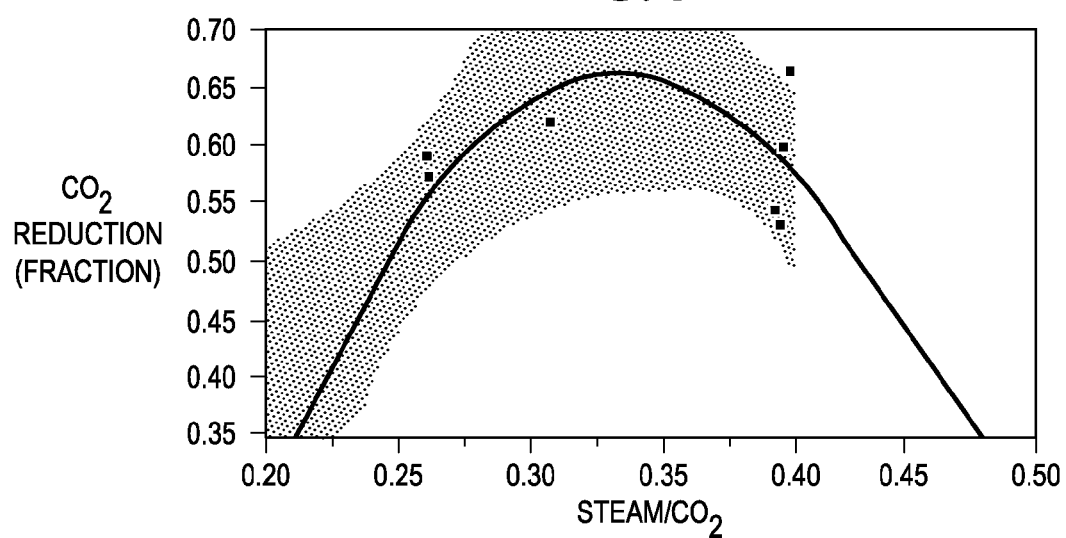
Figure 6:
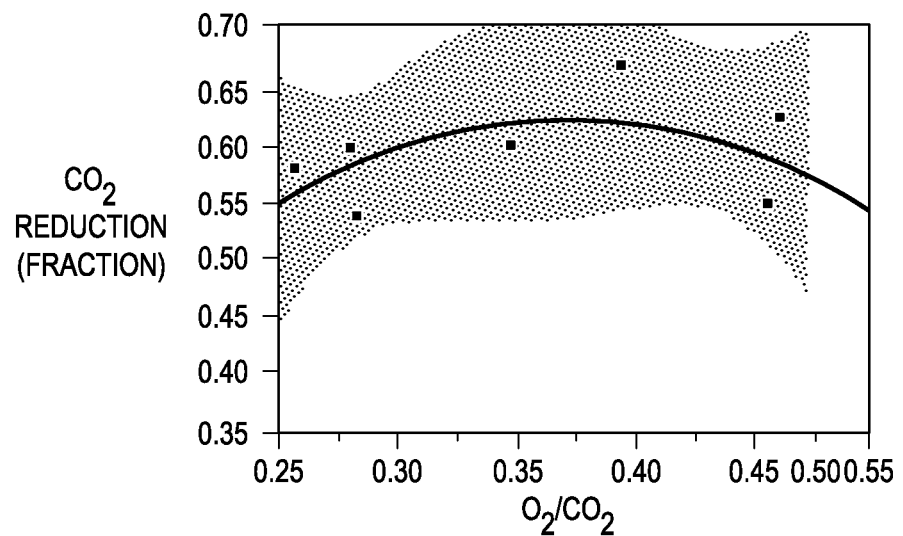
Figure 7:
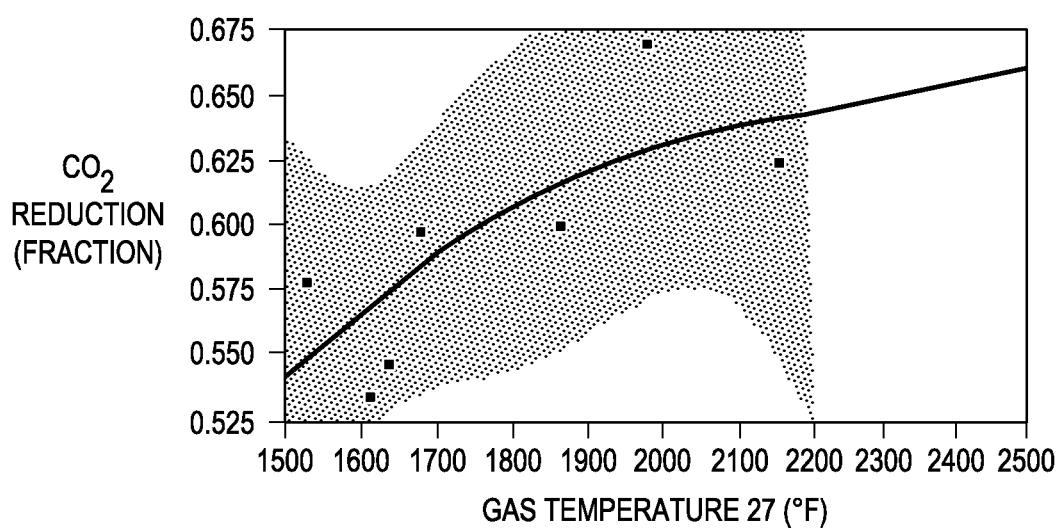

In addition, to further aid in understanding the invention, four curves showing the ratio of input carbon to the total carbon dioxide ($C/CO_2$), input steam to total carbon dioxide ($H_2O/CO_2$) and total oxygen to total carbon dioxide ($O_2/CO_2$) for all nine runs are illustrated with the resulting percent $CO_2$ reduction (expressed as a fraction) of carbon dioxide (i.e., $CO_2$ out/$CO_2$ in) in FIG. 8.

Figure 9:
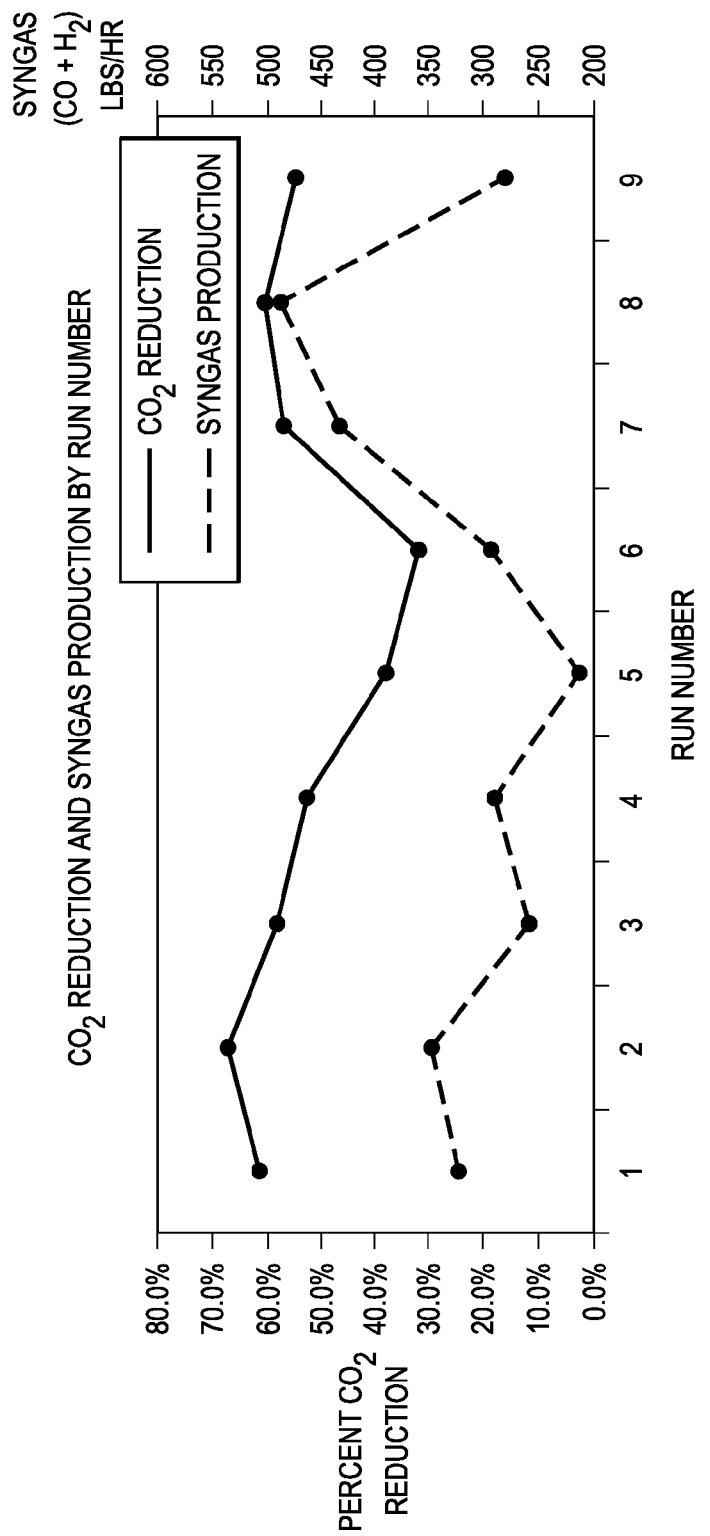
FIG. 9 is a graph showing the percentage of $CO_2$ reduction and the amount of syngas [Carbon monoxide (CO)+Hydrogen ($H_2O$)] generation in lbs/hr for each of the nine test runs.

In addition, and although there is clearly a correlation, it should be noted from FIG. 8, that the conditions that result in the greatest reduction in $CO_2$ does not necessarily generate the most syngas. Therefore, FIG. 9 illustrates on the same graph the reduction percentage of $CO_2$ and the amount of syngas (CO lbs/hr and $H_2$ lbs/hr) produced for each of the nine runs so that the effect of the input parameters can be evaluated for the maximum $CO_2$ reduction and the maximum syngas out.

TABLE 10

(Run 1)
CHAMBER CONDITIONS 1953° F. (1067.2° C.) AND 14.696 PSI

| COMPONENT | Input To Chamber (Lbs/Hr) | Output From Chamber (Lbs/Hr) |
|---|---|---|
| Total Input $CO_2$ from Shroud; Total Output $CO_2$ from Syngas | 154.44 | 62.16 |
| Input Carbon (C) (Coke at 83% Carbon) | 135 (111.7) | — |
| $H_2O$ | 51.00 | 11.76 |
| Total Nitrogen ($N_2$) Input & Output (Input $N_2$ = Shroud + Torch) | 616.5 | 607.68 |
| Oxygen $O_2$ (From Torch) | 76.0 | 25.01 |
| Syngas Out | | |
| Carbon Monoxide (CO) | — | 325.94 |
| Hydrogen ($H_2$) | — | 4.46 |
| TOTALS (note, no slag was recovered from the output) | 1033. | 1037. |

RATIOS:
$C/CO_2 = 0.672$;
$H_2O/CO_2 = 0.307$;
$O_2/CO_2 = 0.459$ 62.6% reduction
Note, the mass balance of input and output agree by 99.6%.

TABLE 11

(Run 2)
Reactor Conditions 1835° F. (1001.7° C.) and 14.696 psi

| COMPONENT | Input To Chamber (Lbs/Hr) | Output From Chamber (Lbs/Hr) |
|---|---|---|
| Total Input $CO_2$ from Shroud; Total Output $CO_2$ from Syngas | 182.52 | 63.87 |
| Input Carbon (C) (Coke at 83% Carbon) | 137 (113.7) | 0.00 |
| $H_2O$ | 77 | 18.68 |
| Total Nitrogen ($N_2$) Input & Output (Input $N_2$ = Shroud + Torch) | 616.5 | 620.36 |

TABLE 11-continued (Run 2)
Reactor Conditions 1835° F. (1001.7° C.) and 14.696 psi

| COMPONENT | Input To Chamber (Lbs/Hr) | Output From Chamber (Lbs/Hr) |
|---|---|---|
| Oxygen $O_2$ (From Torch) | 76 | 36.36 |
| Syngas Out | | |
| Carbon Monoxide (CO) | — | 347.74 |
| Hydrogen ($H_2$) | — | 6.61 |
| TOTALS (note, no slag was recovered from the output) | 1089 | 1094 |

RATIOS:
$C/CO_2 = 0.586$;
$H_2O/CO_2 = 0.396$;
$O_2/CO_2 = 0.392$ 67.1% reduction
Note, the mass balance of input and output agree by 99.5%.

TABLE 12

(Run 7)
CHAMBER CONDITIONS 1553° F. (845.0° C.) AND 14.696 PSI

| COMPONENT | Input To Chamber (Lbs/Hr) | Output From Chamber (Lbs/Hr) |
|---|---|---|
| Total Input $CO_2$ from Shroud; Total Output $CO_2$ from Syngas | 294.84 | 128.99 |
| Input Carbon (C) (Coke at 83% Carbon) | 163 (135.30) | — |
| $H_2O$ | 80.00 | 25.99 |
| Total Nitrogen ($N_2$) Input & Output (Input $N_2$ = Shroud + Torch) | 557.3 | 577.48 |
| Oxygen $O_2$ (From Torch) | 78.08 | 12.59 |
| Syngas | | |
| Carbon Monoxide (CO) | — | 427.20 |
| Hydrogen ($H_2$) | — | 6.18 |
| TOTALS (note, no slag was recovered from the output) | 1173 | 1178 |

RATIOS:
$C/CO_2 = 0.441$;
$H_2O/CO_2 = 0.261$;
$O_2/CO_2 = 0.255$ 57.98% reduction
Note, the mass balance of input and output agree by 99.6%.

TABLE 13

(Run 8)
CHAMBER CONDITIONS 1733° F. (945.0° C.) AND 14.696 PSI

| COMPONENT | Input To Chamber (Lbs/Hr) | Output From Chamber (Lbs/Hr) |
|---|---|---|
| Total Input $CO_2$ from Shroud; Total Output $CO_2$ from Syngas | 294.84 | 123.6 |
| Input Carbon (C) (Coke at 83% Carbon) | 204 (169.3) | — |
| $H_2O$ | 80.00 | 26.75 |
| Total Nitrogen ($N_2$) Input & Output (Input $N_2$ = Shroud + Torch) | 581.4 | 584.88 |

TABLE 13-continued (Run 8)
CHAMBER CONDITIONS 1733° F. (945.0° C.) AND 14.696 PSI

| COMPONENT | Input To Chamber (Lbs/Hr) | Output From Chamber (Lbs/Hr) |
|---|---|---|
| Oxygen $O_2$ (Input is from Torch) | 85.47 | 7.65 |
| Syngas Out | | |
| Carbon Monoxide (CO) | — | 502.21 |
| Hydrogen ($H_2$) | — | 6.16 |
| TOTALS (note, no slag was recovered from the output) | 1246 | 1251 |

RATIOS:
$C/CO_2$ = 0.549;
$H_2O/CO_2$ = 0.260;
$O_2/CO_2$ = 0.279 59.88% reduction
Note, the mass balance of input and output agree by 99.6%.

Therefore, by reviewing the computer simulated test runs and the fourteen actual test runs that validated the computer test runs, it can be predicted from the data obtained from these test runs that the preferred reaction temperature should be no lower than about 1500° F. (815.6° C.). It is also noted, that a temperature of about 2426° F. (1330° C.) was set as a target to achieve maximum $CO_2$ conversion, however, temperatures above 2426° F. (1330° C.) will also result in high $CO_2$ conversion, but may not provide any significant additional benefit.

To date, it has not been possible to operate present available test facilities at a temperature above 2150° F. However, the computer simulation tests clearly indicate, as discussed below, that if a higher temperature was to be used, the $CO_2$ reduction may well be increased to a level even better than the actual 67.13% achieved during one of the last nine test runs and without measurable uncombined carbon in the syngas output. However, a temperature below about 1500° F. (815.6° C.) may result in some unreacted carbon material in the carbon bed being exhausted such that unreacted carbon (C) could be present in the exhaust and/or syngas. Such unreacted carbon could also leave deposits on the chamber walls and possibly deactivate a catalyst if one were used.

The data results of the nine test runs verified that using temperatures between 1553° F. and 2018° F. for the inventive process provides a $CO_2$ reduction of between 33.21% and 67.13% when the ratio of C to $CO_2$ was maintained between about 0.420 and 0.670, the ratio of steam ($H_2O$) to $CO_2$ was maintained between about 0.220 and 0.400; and the $O_2$ to $CO_2$ ratio was maintained between about 0.2 and 0.5. Further, and referring to Runs 7 and 8, it can be seen that although the total reduction of $CO_2$ was not as great as in Runs 1 and 2, the amount of commercially usable syngas (CO and $H_2$) produced was significantly higher (i.e. 433.38 lbs/hr and 508.37 lbs/hr respectively.

In addition, by extrapolating from the second order curves of FIGS. 4-7 and/or using the Predictive equation (6) above, it can also be predicted that satisfactory $CO_2$ reduction should also result at a $C/CO_2$ ratio of between about 0.200 and 0.900, a $H_2O/CO_2$ ratio of between about 0.100 and 0.500, and the $O_2/CO_2$ ratio should preferably be less than 0.600. In addition, it is believed, and the predictive equation confirms, that use of a chamber that can maintain temperatures of 2426° F. (1330° C.) and higher during the process, reduction rates of 90% or greater can be achieved.

As will be appreciated by those skilled in the art, other known ecologically friendly processes can be combined with the inventive process described above. As an example and referring to FIG. 10, there is shown the process of, FIG. 1 wherein the source 22 for creating heat energy (i.e., electricity, steam, etc. is the syngas from gasification chamber 36 produced by a prior art plasma arc carbonaceous material gasification process that uses various waste products such as municipal solid waste (MSW) as a fuel source to produce the syngas. It should also be clearly understood, that the gasification chamber 36 discussed with the embodiment of FIG. 10 operates at a significantly lower temperature than the reaction chambers 10 discussed above with respect to this invention, and does not reduce a $CO_2$ stream to produce syngas. That is, the gasification chamber 36 does not convert carbon dioxide to syngas. Only the reactor 10 in FIG. 1 represents the reaction chamber of this invention. As shown, in FIG. 10, the MSW (municipal Solid Waste) 34 is provided to the plasma arc Gasifier 36 along with an oxygen source 38. Other carbon materials, such as coke could be used as. In any event, the Gasifier 36 converts the input coal, coke or other carbonaceous material (not $CO_2$) to a dirty or raw syngas and provides this syngas as indicated by line 40a as an output. Other byproducts 42 include metals and vitrified slag. The dirty syngas is then provided to an emission control system 45 to remove various other byproducts 46 from the syngas such as sulfur and hydrochloric acid, etc. This leaves a clean syngas provided on line 40b that is then used to provide the required energy to produce the necessary steam and heat energy used by the pyrolysis reaction chamber to reduce the input stream of carbon dioxide and convert it to syngas according to the teachings of this invention.

Referring now to FIG. 11, there is again shown the process of FIGS. 1 and 2. However, as shown, the syngas generated according to the teachings of this invention is now further processed to produce ethanol. As shown, the syngas 32 is provided by line 50 to a water-gas shift reactor 52 and then to a bio-catalytic or catalytic reactor 54 such as a Fischer-Tropsch synthesis reactor. As known by those skilled in the art, the Fischer-Tropsch reactor may be used to convert the syngas 32 to Ethanol as indicated by block 56. More specifically, for a bio-catalytic reactor assuming that a flow of Syngas comprised of about 156,147 lbs/hr of carbon monoxide (CO), 2,545 lbs/hr of hydrogen ($H_2$), 75,195 lbs/hr of carbon dioxide ($CO_2$) is provided to the water-gas shift reactor 52, water (steam) will be required to adjust the carbon monoxide (CO) and hydrogen ($H_2$) molar ratio to 3.00 moles of carbon monoxide (CO) for 1.00 each mole of hydrogen ($H_2$).

This adjustment is according to the reaction represented by:

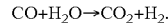

$$CO + H_2O \rightarrow CO_2 + H_2. \quad \text{Equation (5):}$$

Thus, it will be appreciated that the water-gas shift reactor 52 can be adjusted to produce Syngas having a wide range of molar ratios to meet the needs of various conversion processes that convert or use Syngas. Conversion processes presently in use may successfully operate with carbon monoxide (CO) to hydrogen ($H_2$) ratios that range between 0.2 to 5.0 moles of carbon monoxide and 5.0 to 0.2 moles of hydrogen.

More specifically, a mass flow rate of 156,147 lbs/hr of carbon monoxide (CO) is 5,574.7 lbs-mole/hr, and 2,545 lbs/hr of hydrogen ($H_2$) is 1,262.4 lbs-mole/hr of hydrogen ($H_2$). Therefore, the water-gas shift reactor is set to shift or rearrange the amount of carbon monoxide (CO) and hydrogen ($H_2$) such that the final mixture ratio comprises 5,127.8 lbs-mole/hr of carbon monoxide (CO) and 1,709.3 lbs-mole/hr of hydrogen ($H_2$). This shift is selected to facilitate the reaction that produces Ethanol ($C_2H_5OH$). The reaction is shown below in Equation (7).

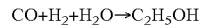

$$CO + H_2 + H_2O \rightarrow C_2H_5OH \quad \text{Equation (7)}$$

Similar to the above discussion concerning Equation (5), this reaction takes place with a carbon monoxide (CO) to hydrogen ($H_2$) molar ratio of between 3.0 and 0.2 of Carbon Monoxide to 1.0 of hydrogen. With this adjustment, the production of Ethanol from a bio-catalytic reactor is about 60,136 lbs/hr of Ethanol, which is about 80,120,000 gallons/yr. after distillation.

This reaction does not produce carbon dioxide ($CO_2$). Therefore, from the start of the industrial gaseous stream 14 containing 160,000 lbs/hr of carbon dioxide ($CO_2$) to the discharge of the pyrolysis reactor 10, the reduction in emitted carbon dioxide ($CO_2$) is 75,195 lbs/hr, or a reduction of about 53%. The water-gas shift adds about 19,667 lbs/hr of carbon dioxide ($CO_2$) for a total of 94,862 lbs/hr of carbon dioxide ($CO_2$) rather than the original 160,000 lbs/hr for about a total 40% reduction. Of course, in addition to the reduction in exhausted $CO_2$, there is a bonus of 60,136 lbs/hr (or 80,120,000 gallons/yr.) of ethanol. It will be appreciated, of course, if the reduction of the $CO_2$ is at the higher rates (i.e., 67% to 90+%), as was discussed above, the overall reduction rate would be greater than the 40% illustrated.

Figure 10:
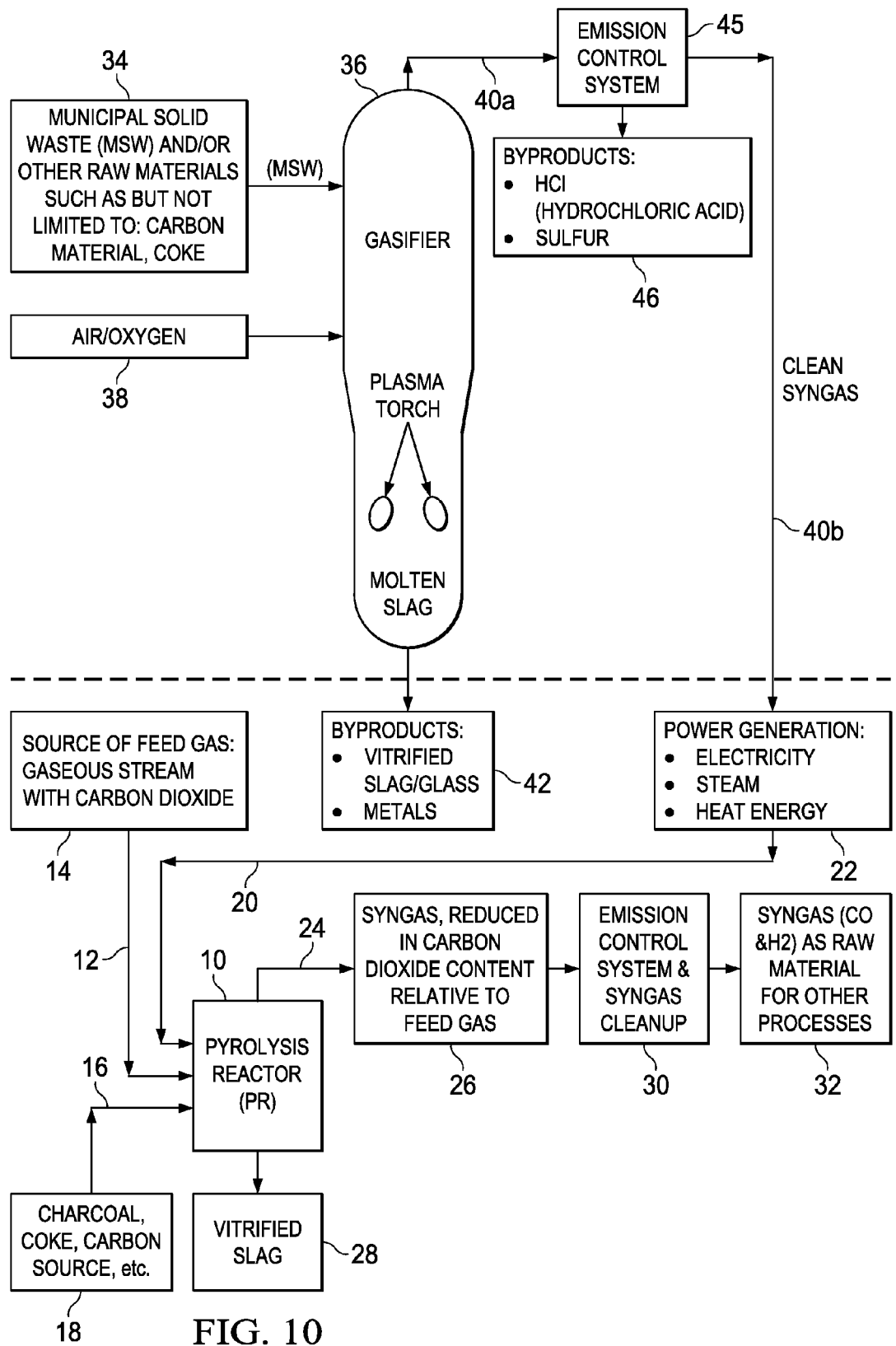
FIG. 10 is similar to FIG. 1, but includes a Gasifier of a presently available process for the gasification of municipal solid waste to Syngas. The syngas, in turn, provides the output power (e.g., electricity, steam and/or heat) to the pyrolysis reactor of the present invention that reduces the $CO_2$ and generates syngas from the conversion of the $CO_2$.
Figures 11, 12:
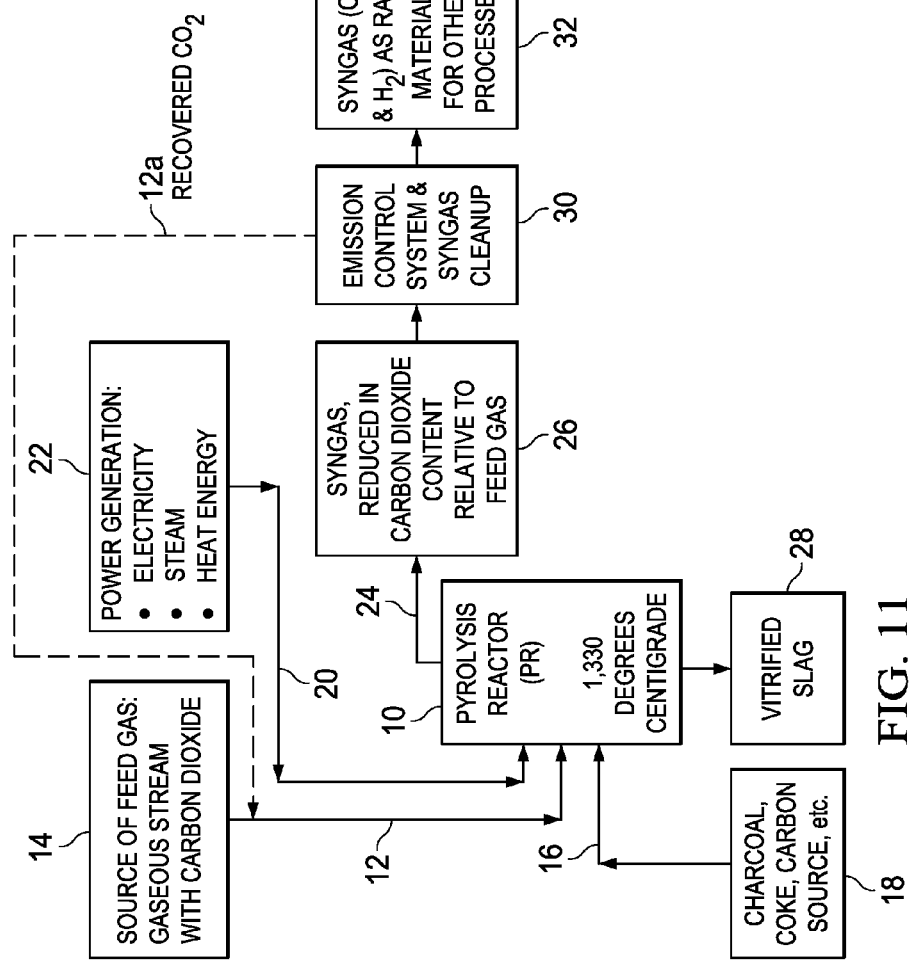
FIG. 11 illustrates the process of FIG. 1, 2 or 10 combined with another process for the production of Ethanol.
FIG. 12, which includes
Figure 12A:
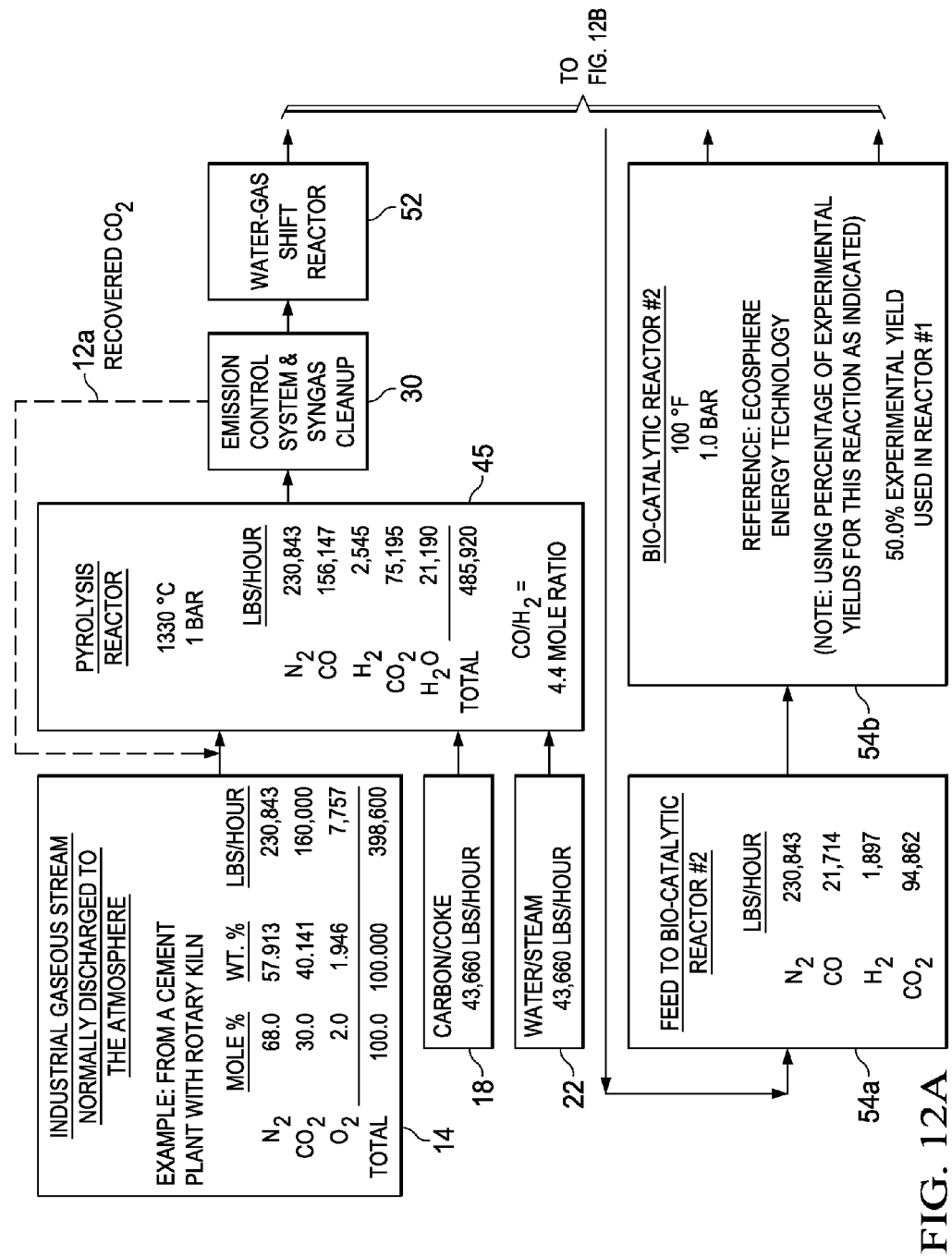
FIGS. 12a and 12b, is a detailed example of FIG. 11 illustrating the use of a first and a second bio-catalytic reactor.
Figure 12B:
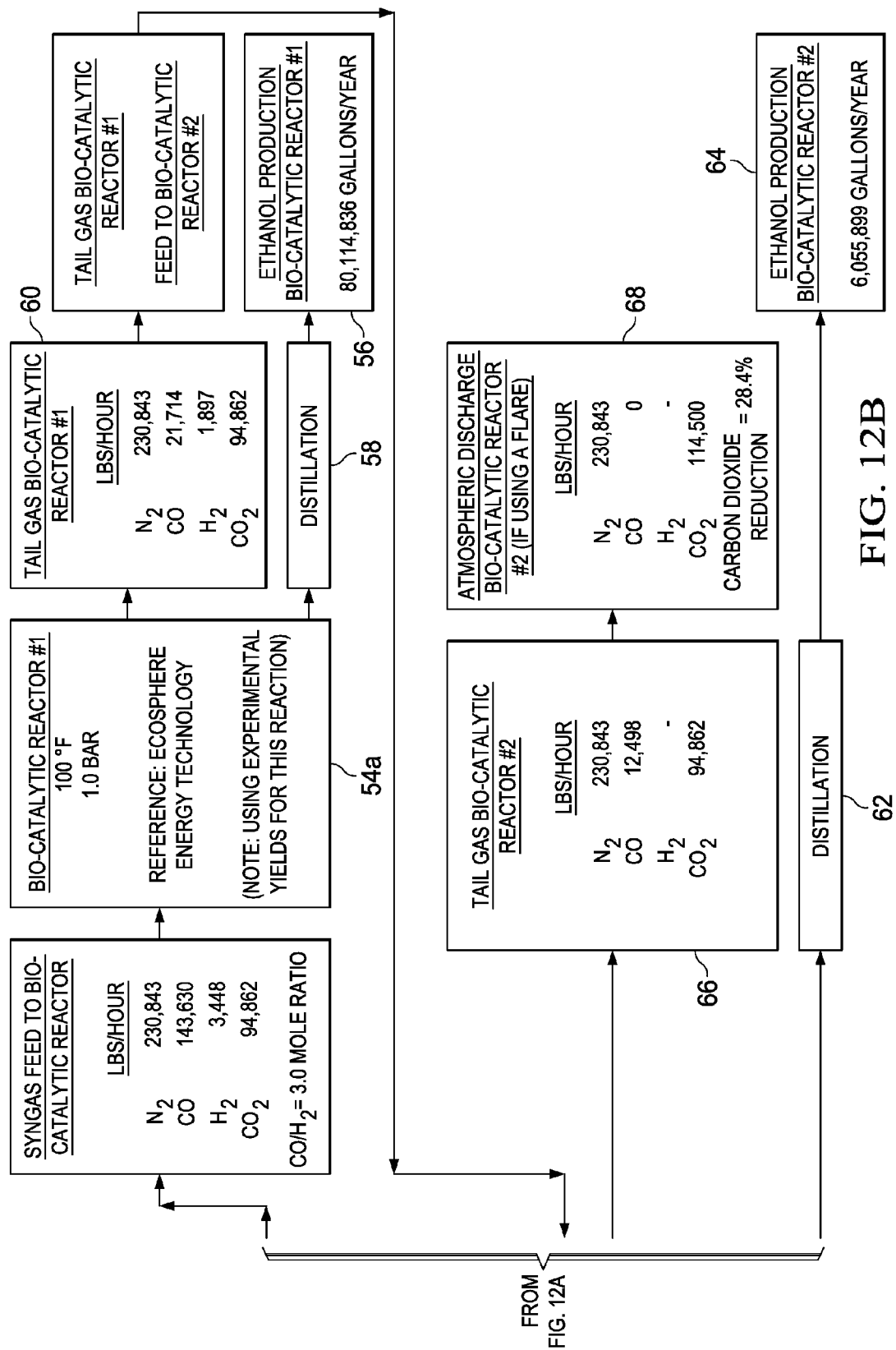

Referring to FIGS. 12, 12a and 12b, there is shown a more detailed block flow diagram for producing ethanol that uses two bio-catalytic reactors in series and which illustrates the flow rate of gases, steam, and carbonaceous materials, etc. The reference numbers of common elements or systems are the same as in FIG. 10. However, as shown, rather than a single bio-catalytic converter 54, there is a first bio-catalytic converter 54a that results in the 80,114,836 gallons/yr. of Ethanol (block 56) after being distilled as indicated at 58. As is also shown, however, the tail gas from the bio-catalytic converter 54a comprises 94,862 lbs/hr of carbon dioxide ($CO_2$), as well as 21,714 lbs/hr of carbon monoxide (CO) and 1,897 lbs/hr of hydrogen ($H_2$) as indicated in block 60. Therefore, according to this embodiment, the tail gas of block 60 is provided to a second bio-catalytic converter 54b, that is assumed to operate at a 50% of the yield used in bio-catalytic reactor #1.

Another water-gas shift, as discussed above, is also indicated at block 52. The output of the second bio-catalytic converter 54b is another 6,055,899 gallons/yr. of ethanol, as indicated at block 64, after passing the gas through a second distillation process 62 for a total of 86,170,735 gallons/yr. Since the process does not add carbon dioxide ($CO_2$), the tail gas indicated at block 66 from the second bio-catalystic converter 54b still contains the 94,802 lbs/hr of carbon dioxide ($CO_2$) but reduced carbon monoxide (CO). However, even if the discharge of the tail gas from the second reactor is not recovered as a fuel, but is instead destroyed with a flare burn-off to the atmosphere, an additional 19,638 lbs/hr of carbon dioxide ($CO_2$) may be added to the 94,862 lbs/hr to give a remaining total of 114,500 lbs/hr of carbon dioxide ($CO_2$). However, this still represents a 28.4% reduction of carbon dioxide ($CO_2$) plus the bonus of 86,170,735 gallons/yr. of ethanol.

Referring again to FIG. 12a and if a carbonaceous source contains some non-hydrocarbon impurities, the Syngas may then be provided to an emission control system 30, as was also shown in FIGS. 1 and 10, to remove impurities and clean up the syngas. Also as shown, the carbon dioxide ($CO_2$) in the syngas removed by the Emission Control System and syngas Cleanup processor 30 may be returned to the pyrolysis reactor, as indicated by dotted line 12a. Depending upon the feed to the pyrolysis reactor, the impurities in the syngas could be about 0.5 wt. % chlorine and 0.8 wt. % sulfur based upon an elemental analysis of the feed, as an example. Most of the sulfur is converted to hydrogen sulfide ($H_2S$) but some is converted to carbonyl sulfide (COS). Chlorine is converted to hydrogen chloride (HCl). Trace elements of mercury and arsenic can be found in the syngas prior to cleaning. Some particulate carryover may occur with the syngas from the pyrolysis reactor. Selection of the technology for gas cleanup depends upon the purity requirements of downstream processes using the syngas.

Particulate control is typically a Metal Candle filter or Water scrubber in combination with a cyclone. Sulfur recovery is typically of a Claus plant. The acid gases such as hydrogen chloride are recovered by solvent-based processes. Thus, syngas comprised of carbon monoxide (CO) and hydrogen ($H_2$) is available for further processing, as indicated at block 32.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, means, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. A process for generating syngas from $CO_2$, the process comprising:
    maintaining said reaction chamber at a temperature of at least 1500° F. (815.6° C.) and at a pressure of about one bar or greater;
    providing a gaseous stream containing carbon dioxide ($CO_2$) at a first selected rate to said reactor as a feed gas;
    providing carbon (C) to said reaction chamber at a second selected rate, the ratio of said provided carbon with respect to the provided $CO_2$ being between about 0.200 and 0.900;
    providing $H_2O$ to said reaction chamber at a third selected rate, the ratio of said provided $H_2O$ with respect to said provided $CO_2$ being between about 0.100 and 0.500; and
    reacting said carbon, said $H_2O$ and said carbon dioxide ($CO_2$) in said gaseous stream to reduce said provided $CO_2$ by at least 30% to form a syngas comprising carbon monoxide (CO) and hydrogen ($H_2$), and said second selected rate at which said carbon is provided to said reaction chamber is the same rate as said carbon is combined with oxygen to form said CO such that all of said provided carbon exits said reaction chamber in the form of CO or $CO_2$ as said syngas.

2. The process of claim 1, and further comprising a catalyst to increase the efficiency of the process.

3. The process of claim 1, wherein said ratio of said provided $H_2O$/steam with respect to said provided $CO_2$ is between about 0.220 and about 0.400.

4. The process of claim 1, wherein said ratio of said provided carbon with respect to the provided $CO_2$ being between about 0.420 and about 0.670.

5. The process of claim 4, and further comprising a catalyst to increase the efficiency of the process.

6. The process of claim 1, wherein said ratio of said provided $H_2O$ with respect to said provided $CO_2$ is between about 0.220 and about 0.400, and said ratio of said provided carbon with respect to the provided $CO_2$ being between about 0.420 and about 0.670.

7. The process of claim 1, wherein said chamber temperature is about 2426° F. (1330° C.).

8. The process of claim 1, wherein said reaction chamber is selected to be one of a pyrolysis reactor, a conventional gasifier or a plasma arc chamber.

9. The process of claim 1, wherein oxygen supplied to the chamber is maintained at an oxygen to carbon dioxide ratio ($O_2/CO_2$) no greater than 0.600.

10. The process of claim 1, wherein said carbon is selected from the group consisting of charcoal, coke, coal, a hydrocarbon, solid waste and biomass.

11. The process of claim 1, wherein said carbon is solid waste or biomass.

12. The process of claim 1, wherein said $H_2O$ provided as a reactant into said reaction chamber is steam.

13. The process of claim 1, wherein said step of reacting comprises a Boudouard reaction.

14. The process of claim 1, further comprising the step of providing said carbon monoxide (CO) and hydrogen ($H_2$) (i.e. syngas) to an emission control system to clean said syngas by removing impurities.

15. The process of claim 14, wherein said cleaned syngas is provided to a water-gas shift reactor to adjust the carbon monoxide and hydrogen molar ratio to between 0.20 to 5.00 molecules of carbon monoxide for 1.00 moles of hydrogen.

16. The process of claim 15, wherein said molar adjusted carbon monoxide and hydrogen are provided to a bio-catalytic reactor to produce ethanol.

17. The process of claim 16, wherein said bio-catalytic reactor is a Fischer-Tropsch synthesis reactor.

18. The process of claim 16, wherein an output of said bio-catalytic reactor is provided to another bio-catalytic reactor to provide additional ethanol.

19. The process of claim 1, wherein said syngas comprising carbon monoxide and hydrogen is provided to a catalytic reactor to produce an output selected from the group comprising methanol, ethanol, diesel, jet fuel, methane, and/or other liquid or gaseous material.

20. The process of claim 1, wherein said syngas comprising carbon monoxide and hydrogen is provided to a bio-catalytic reactor to produce ethanol.

21. The process of claim 19, wherein an output of said catalytic reactor is provided to another catalytic reactor to produce additional ethanol.

22. The process of claim 17, wherein an output of said bio-catalytic reactor is provided to another bio-catalytic reactor to produce additional ethanol.

23. The process of claim 1, wherein said reacting step results in a portion of the $H_2O$ remaining in the reactor.

24. The process of claim 1, wherein said step of maintaining said reaction chamber at a temperature comprises using a heating source that introduces $O_2$ into said reaction chamber.

25. The process of claim 1, wherein said step of providing carbon to said reaction chamber introduces $O_2$ into said reaction chamber.

26. The process of claim 25, wherein said maintaining said reaction chamber at a temperature comprises using a heating source that introduces $O_2$ into said reaction chamber.

27. The process of claim 25 wherein the ratio of said introduced $O_2$ with respect to the provided $CO_2$ is less than 0.500.

28. A process for producing syngas that reduces the amount of carbon dioxide in a gaseous stream by at least 30%, the process comprising:
maintaining a reaction chamber at a temperature of at least about 1500° F. (815.6° C.) and at a pressure of about one bar or greater, and wherein maintaining said reaction chamber at a temperature comprises using a heating source that introduces $O_2$ into said reaction chamber;
providing a gaseous stream containing carbon dioxide ($CO_2$) to said reactor at a first selected rate, and wherein the ratio of said introduced $O_2$ with respect to said provided $CO_2$ is less than about 0.500;
providing a carbonaceous material to said reaction chamber at a second selected rate, the ratio of carbon in said carbonaceous material provided with respect to the $CO_2$ provided being between about 0.200 and about 0.900;
providing $H_2O$ to said reaction chamber at a third selected rate, the ratio of said $H_2O$ provided with respect to said $CO_2$ provided being between about 0.100 and about 0.500; and
reacting said carbonaceous material, said $H_2O$ and said carbon dioxide ($CO_2$) in said gaseous stream to reduce said $CO_2$, to form an output gaseous stream of syngas consisting essentially of nitrogen ($N_2$), carbon dioxide ($CO_2$), carbon monoxide (CO) and hydrogen ($H_2$), and wherein said second selected rate of the carbonaceous material provided to said reaction chamber being selected such that substantially all of said provided carbon combines with oxygen and exits said reaction chamber as $CO_2$ or CO.

29. The process of claim 28, wherein said ratio of said provided $H_2O$ with respect to said provided $CO_2$ is between about 0.220 and about 0.400.

30. The process of claim 28, wherein said ratio of carbon in said provided carbonaceous material with respect to the provided $CO_2$ being between about 0.420 and about 0.670.

31. The process of claim 28, wherein said ratio of said provided $H_2O$ with respect to said provided $CO_2$ is between about 0.220 and about 0.400, and said ratio of said provided carbonaceous material with respect to the provided $CO_2$ being between about 0.420 and about 0.670.

32. The process of claim 28, wherein said step of providing a carbonaceous material to said reaction chamber introduces $O_2$ into said reaction chamber.

33. A process for producing syngas that reduces the $CO_2$ (carbon dioxide) in a feed gas or gaseous stream to generate syngas from said $CO_2$, the process comprising:
maintaining said reaction chamber at a temperature of at least 1500° F. (815.6° C.) and at a pressure of about one bar or greater;
providing said gaseous stream containing carbon dioxide ($CO_2$) at a first selected rate to said reactor;
providing carbon (C) to said reaction chamber at a second selected rate, the ratio of said provided carbon with respect to the provided $CO_2$ being between about 0.200 and 0.900;
providing $H_2O$ to said reaction chamber at a third selected rate, the ratio of said provided $H_2O$ with respect to said provided $CO_2$ being at least about 0.100 and 0.500; and
reacting said carbon, said $H_2O$ and said carbon dioxide ($CO_2$) in said gaseous stream to reduce said $CO_2$ by at least 30% to form a syngas comprising carbon monoxide (CO) and hydrogen ($H_2$), wherein said second selected rate at which the carbon is provided is selected such that any carbon exiting said reaction chamber in said syngas has combined with oxygen and comprises CO or $CO_2$.

34. The process of claim 33, wherein said ratio of said provided $H_2O$ with respect to said provided $CO_2$ is between about 0.220 and about 0.400.

35. The process of claim 33, wherein said ratio of said provided carbon with respect to the provided $CO_2$ being between about 0.420 and about 0.670.

36. The process of claim 33, wherein said ratio of said provided $H_2O$ with respect to said provided $CO_2$ is between about 0.220 and about 0.400, and said ratio of said provided carbon with respect to the provided $CO_2$ being between about 0.420 and about 0.670.

37. The process of claim 33, wherein said chamber temperature is about 2426° F. (1330° C.).

38. The process of claim 33, wherein said step of providing carbon to said reaction chamber introduces $O_2$ into said reaction chamber.

39. The process of claim 28, wherein said chamber temperature is about 2426° F. (1330° C.).

40. The process of claim 28, wherein said chamber temperature is maintained between about 1500° F. (815.6° C.) and about 3000° F. (1649° C.).

41. The process of claim 1, wherein said chamber temperature is maintained between about 1500° F. (815.6° C.) and about 3000° F. (1649° C.).

42. The process of claim 33, wherein said chamber temperature is maintained between about 1500° F. (815.6° C.) and about 3000° F. (1649° C.).

43. The process of claim 1, wherein said syngas is used to produce a fuel comprising methanol, ethanol, diesel, and/or jet fuel.

44. The process of claim 1, wherein said provided $CO_2$ is reduced by at least 53%.

45. The process of claim 1, wherein said provided $CO_2$ is reduced by at least 64.5%.

46. The process of claim 28, wherein said provided $CO_2$ is reduced by at least 53%.

47. The process of claim 28, wherein said provided $CO_2$ is reduced by at least 64.5%.

48. The process of claim 33, wherein said provided $CO_2$ is reduced by at least 53%.

49. The process of claim 33, wherein said provided $CO_2$ is reduced by at least 64.5%.

50. A process for generating syngas from $CO_2$, the process comprising:
   maintaining said reaction chamber at a temperature of at least 2,150° F. (1,371° C.) and at a pressure of about one bar or greater;
   providing a gaseous stream containing carbon dioxide ($CO_2$) at a first selected rate to said reactor as a feed gas;
   providing carbon (C) to said reaction chamber at a second selected rate, the ratio of said provided carbon with respect to the provided $CO_2$ being between about 0.200 and 0.900; and
   reacting said carbon and said carbon dioxide ($CO_2$) in said gaseous stream to reduce said provided $CO_2$ by at least 56.5% to form a syngas comprising carbon monoxide (CO) and hydrogen ($H_2$), and said second selected rate at which said carbon is provided to said reaction chamber is the same rate as said carbon is combined with oxygen to form said CO such that all of said provided carbon exits said reaction chamber in the form of CO or $CO_2$ as said syngas.

51. A process for producing syngas that reduces the amount of carbon dioxide in a gaseous stream by at least 56%, the process comprising:
   maintaining a reaction chamber at a temperature of at least about 2,150° F. (1,371° C.) and at a pressure of about one bar or greater, and wherein maintaining said reaction chamber at a temperature comprises using a heating source that introduces $O_2$ into said reaction chamber;
   providing a gaseous stream containing carbon dioxide ($CO_2$) to said reactor at a first selected rate;
   providing a carbonaceous material to said reaction chamber at a second selected rate, the ratio of carbon in said carbonaceous material provided with respect to the $CO_2$ provided being between about 0.200 and about 0.900; and
   reacting said carbonaceous material and said carbon dioxide ($CO_2$) in said gaseous stream to reduce said $CO_2$, to form an output gaseous stream of syngas consisting essentially of nitrogen ($N_2$), carbon dioxide ($CO_2$), carbon monoxide (CO) and hydrogen ($H_2$), and wherein said second selected rate of the carbonaceous material provided to said reaction chamber being selected such that substantially all of said provided carbon exiting said reaction chamber combines with oxygen and exits said reaction chamber as $CO_2$ or CO.

\* \* \* \* \*